(12) United States Patent
Greiner et al.

(10) Patent No.: US 10,737,167 B2
(45) Date of Patent: Aug. 11, 2020

(54) BASEBALL PITCH QUALITY DETERMINATION METHOD AND APPARATUS

(71) Applicant: Greiner Agencies, Inc., Edmonton (CA)

(72) Inventors: Jarvis T. Greiner, Los Angeles, CA (US); Jason Wilson, Whittier, CA (US)

(73) Assignee: GREINER AGENCIES INC., Edmonton (CA)

( * ) Notice: Subject to any disclaimer, the term of this patent is extended or adjusted under 35 U.S.C. 154(b) by 592 days.

(21) Appl. No.: 14/645,361

(22) Filed: Mar. 11, 2015

(65) Prior Publication Data

US 2015/0260512 A1 Sep. 17, 2015

Related U.S. Application Data

(60) Provisional application No. 61/951,915, filed on Mar. 12, 2014, provisional application No. 61/954,541, (Continued)

(51) Int. Cl.
*G01B 21/00* (2006.01)
*A63B 71/06* (2006.01)
(Continued)

(52) U.S. Cl.
CPC ........ *A63B 71/0616* (2013.01); *G01S 13/589* (2013.01); *G01S 13/88* (2013.01); (Continued)

(58) Field of Classification Search
None
See application file for complete search history.

(56) References Cited

U.S. PATENT DOCUMENTS 4,442,823 A * 4/1984 Floyd .................. A63B 69/406
124/41.1
5,012,790 A 5/1991 Bates
(Continued)

FOREIGN PATENT DOCUMENTS

JP 2008/284166 11/2008

OTHER PUBLICATIONS

Alan N. Nathan, The effect of spin on the flight of a baseball, Department of Physics, University of Illinois, Urbana, Illinois 61801, Feb. 2008, pp. 119-124.*

(Continued)

*Primary Examiner* — Tung S Lau
(74) *Attorney, Agent, or Firm* — Robert A. Nissen

(57) ABSTRACT

The disclosure provides for systems and methods for determining a pitch rating for a pitch in baseball. The pitch rating can be configured to be indicative of a quality of breaking and non-breaking pitches. The disclosure provides for a detection system that detects the position of the ball. The pitch rating can then be calculated by extracting flight parameters from the detection data and multiplying appropriate flight path parameters by pitch rating coefficients. The pitch rating coefficients can be tailored such that the pitch rating calculation provides a value that is correlated to a subjective opinion on pitch quality provided by an expert. The pitch rating can then be displayed in real time to provide feedback or information about a quality of the pitch.

14 Claims, 9 Drawing Sheets

Related U.S. Application Data filed on Mar. 17, 2014, provisional application No. 62/128,951, filed on Mar. 5, 2015.

(51) Int. Cl.
| | |
|---|---|
| *G01S 13/58* | (2006.01) |
| *G01S 13/88* | (2006.01) |
| *G06T 7/20* | (2017.01) |
| *A63B 69/00* | (2006.01) |

(52) U.S. Cl.
CPC ............ *G06T 7/20* (2013.01); *A63B 69/0002* (2013.01); *G06T 2207/30224* (2013.01); *G06T 2207/30241* (2013.01)

(56) References Cited

U.S. PATENT DOCUMENTS

| | | | |
|---|---|---|---|
| 5,439,211 A | 8/1995 | Drabowsky | |
| 5,779,241 A | 7/1998 | D'Costa et al. | |
| 5,897,445 A * | 4/1999 | Sanders | A63B 24/0003 473/421 |
| 6,082,350 A * | 7/2000 | Crews | A63B 47/00 124/78 |
| 6,102,021 A | 8/2000 | Sanders et al. | |
| 6,182,649 B1 * | 2/2001 | Battersby | A63B 69/406 124/78 |
| 8,001,838 B2 | 8/2011 | Roberts | |
| 8,335,345 B2 | 12/2012 | White et al. | |
| 8,876,638 B2 | 11/2014 | Paul et al. | |
| 2002/0081002 A1 | 6/2002 | Lee et al. | |
| 2002/0148455 A1 * | 10/2002 | Trajkovic | A63B 24/00 124/34 |
| 2003/0040381 A1 * | 2/2003 | Richings | A63B 47/00 473/415 |
| 2004/0235565 A1 | 11/2004 | Shiozawa | |
| 2005/0153764 A1 | 7/2005 | Sterchi et al. | |
| 2007/0293331 A1 | 12/2007 | Tuxen | |
| 2008/0103997 A1 | 5/2008 | Fein et al. | |
| 2008/0188353 A1 | 8/2008 | Vitolo et al. | |
| 2008/0293464 A1 | 11/2008 | Cheng et al. | |
| 2009/0093300 A1 | 4/2009 | Lutnick et al. | |
| 2009/0149974 A1 | 6/2009 | Storch et al. | |
| 2009/0182691 A1 | 7/2009 | Khaderi | |
| 2010/0081524 A1 | 4/2010 | Husband | |
| 2011/0190912 A1 | 8/2011 | Paul et al. | |
| 2013/0106894 A1 * | 5/2013 | Davis | G06F 17/30032 345/589 |

OTHER PUBLICATIONS

Jason John Martin, Evaluation of Doppler Radar Ball Tracking and Its Experimental Uses, Master of Science in Mechanical Engineering Washington State University, Department of Mechanical and Materials Engineering Dec. 2012, pp. 210.*

Bashir, et al., "Real-Time Motion Trajectory-Based Indexing and Retrieval of Video Sequences." IEEE Transactions on Multimedia, vol. 9, No. 1, Jan. 2007, pp. 58-65.

International Search Report and Written Opinion for PCT Application No. PCT/US15/20240 dated Jul. 7, 2015 in 14 pages.

Martin, Jason John, Evaluation of Doppler Radar Ball Tracking and Its Experimental Uses, Washington State University, Department of Mechanical and Materials Engineering, Dated Dec. 12, 2012 in 210 pages.

On That Stuff, Baseballanalysts.com, in 15 pages, Sep. 9, 2009, retrieved Jan. 28, 2017.

FanGraphs Sabermetrics Library, What is PITCHF/x?, in 1 page, accessed on Nov. 2, 2017.

Steiner, Nick, "Beyond DIPS", Jan. 27, 2010, in 10 pages, The Hardball Times, retrieved Nov. 2, 2017.

Walsh, John, "Searching for the game's best pitch", The Hardball Times, Feb. 26, 2008, in 10 pages.

Triplesalley, "Understanding Linear Weights", Analysis of the San Francisco Giants, Baseball and Sabermetric, Mar. 9, 2011, in 4 pages.

Chiado, Garrett, "Introducing cLWTS—Putting Pitch Data into Context: Introducing Contextual Pitch Type Linear Weights", The Sabermagician, in 9 pages, retrieved Nov. 3, 2017.

Roegele, Jon, "Strike Zone Pitch Quality, Part I: Location", SBNation, Beyond the Sox Score, Mar. 29, 2013, in 8 pages.

Roegele, Jon, "Pitch Quality, Part II: Strike Zone Location and now with Velocity!", SBNation Beyond the Sox Score, Apr. 12, 2013, in 8 pages.

* cited by examiner

BASEBALL PITCH QUALITY DETERMINATION METHOD AND APPARATUS

CROSS-REFERENCE TO RELATED APPLICATIONS

This application claims the benefit of priority to U.S. Provisional Patent Application No. 61/951,915 filed Mar. 12, 2014 and entitled "Baseball Breaking Pitch Quality Determination Method and Apparatus"; to U.S. Provisional Patent Application No. 61/954,541 filed Mar. 17, 2014 and entitled "Baseball Pitch Quality Determination Method and Apparatus"; and to U.S. Provisional Patent Application No. 62/128,951 filed Mar. 5, 2015 and entitled "Baseball Pitch Quality Determination Method and Apparatus." Each of the applications reference in this paragraph is incorporated by reference herein in its entirety.

BACKGROUND

Field

This disclosure generally relates to determining the quality of a pitch in baseball.

Description of Related Art

The quality of a pitcher is generally judged by traditional baseball metrics including the pitcher's earned run average, wins, and/or saves. Pitches are generally judged based on whether the ball is in the strike zone, whether a batter is able to hit the pitch, and/or the result of the pitch (e.g., a strike, ball, foul ball, hit, etc.). Further it is common to classify pitches based on the trajectory and/or speed of a pitch where such classifications include, for example, fastball, four-seam fastball, two-seam fastball, cutter (or cut fastball), forkball, splitter, sinker, breaking ball, curve ball, slider, screw ball, changeup ball, palm ball, circle change, super changeup, knuckleball, eephus pitch, spitball, gyro ball, shuuto, etc.

SUMMARY

The systems, methods and devices described herein have innovative aspects, no single one of which is indispensable or solely responsible for their desirable attributes. Without limiting the scope of the claims, some of the advantageous features will now be summarized.

One aspect of the present disclosure is the recognition that the speed of the pitch is not necessarily the most relevant factor for assessing the quality of pitches, e.g., curveballs, fastballs, etc. At times, the speed metric may be misleading for pitches, as a layperson may automatically assume that a higher pitch speed indicates a higher pitch quality. Experts who have studied pitching can differentiate between pitches of similar quality, but a layperson watching a pitcher may be unable to do so.

The present disclosure provides for systems, devices, and methods of assigning a quality metric to pitches in baseball through detection and analysis of the pitch's flight path and speed. The quality metric, or pitch rating, can be configured to convey quickly and accurately an idea of the quality of the pitch. The use of this pitch rating can advantageously provide for a standard rating system that can be used to compare different pitches and different pitchers. This can be beneficial for casual viewers of a baseball game as it can provide information about the pitch quality for each pitch, information that is not necessarily tied to the speed of each pitch. It can also advantageously enable a pitcher and/or coach to gauge and track improvement in pitches or pitch performance over time, being able to compare different throwing techniques, performance in different situations, performance against different batters, etc. The pitch rating can be used as a training tool wherein a coach or player can adjust the mechanics of the pitching motion to increase the average pitch rating for one or more types of pitches. The pitch rating can be used in scouting pitchers by providing a standardized and/or uniform metric to compare pitchers who play in different leagues, levels, countries, etc. This can allow personnel to compare pitchers objectively, removing or reducing effects such as, for example, batters a pitcher faces, umpires, weather, etc. The pitch rating can be used by coaches during baseball games to assess the pitcher's performance and trends in performance to know when to replace a particular pitcher in a game. The pitch rating can be used over the course of many games to assess performance and trends in performance to identify potential risk factors for a particular pitcher, such as identifying potential for injury where pitch quality decreases over the course of several games or weeks. The pitch rating can leverage the expertise of a number of pitchers and pitching coaches by adjusting the pitch rating calculation to statistically correlate with subjective ratings of pitches. In this way, the pitch rating can standardize what had previously been a subjective analysis.

In some implementations, the pitch rating includes a metric associated with the trajectory of a pitch. The trajectory of a pitch can be broken down into components such as rise, breaking point, final location, total break, etc. The trajectory metric can be a function that determines a quality of a pitch based on the rise, breaking point, final location, and total break of the pitch. In some implementations, the trajectory metric can be a mathematical combination (e.g., a linear combination) of these components. The trajectory metric can reflect an intuitive relationship between rise (larger values decrease pitch rating), breaking point (larger values increase pitch rating), location (proximity to the corners of the strike zone increases the pitch rating), and total break (larger values increase pitch rating). Each component of the trajectory metric can be weighted differently to account for each component's contribution to the quality of a pitch. These weight factors can be included in the determination of the pitch rating by using tailored coefficients in a linear combination of the values of the components. In certain implementations, the values of the coefficients can be adjusted based at least in part on pitchers, skill levels, pitching coaches, etc. to accommodate for different subjective assessments on contributions to pitch quality. In some embodiments, the pitch rating does not include any interaction terms or quadratic terms. In some embodiments, different users or entities can use different functions to calculate the pitch rating wherein the coefficients are tailored according to their particular use.

In some implementations, the pitch rating can be independent of the batter facing the pitcher at the time of the pitch. For example, a standard strike zone can be used that does not depend on the batter (e.g., the strike zone is independent of the batter's height, batting stance, etc.). Similarly, the pitch rating can be independent of the result of the pitch. For example, the pitch rating can be configured to not include any components that account for whether the pitch was hit, whether the pitch was called a strike or a ball, or the like. This can make the pitch rating independent of particular elements that are out of the control of the pitcher, such as the skill of the batter, the particularities of an umpire, luck, etc.

In some implementations, the pitch rating can be adjusted based on the batter facing the pitcher at the time of the pitch. For example, the final location component of the trajectory metric can be adjusted to have a higher or lower value for pitches that are inside (e.g., closer to the batter) versus pitches that are outside (e.g., further from the batter) or that are higher or lower in the strike zone. This can aid in providing an assessment of pitch quality that accounts for the handedness of the batter (e.g., a right-handed or a left-handed batter). As another example, the final location component of the trajectory metric can be adjusted relative to a strike zone that is defined for a particular batter, taking into account the batter's size, stance, and other factors. This can allow for coaches and pitchers to determine the quality of pitches thrown to particular batters, accounting for batter tendencies, preferences, weaknesses, etc. Similarly, the pitch rating can be adjusted based on the result of the pitch. For example, called strikes and/or foul balls can increase the pitch rating and called balls and/or hits can decrease the pitch rating.

In certain implementations, the pitch rating is a result of adjusting the trajectory metric by a speed of the pitch. For example, the pitch rating can be a combination of the trajectory metric and a speed adjustment parameter. In some embodiments, the pitch rating is a mathematical combination (e.g., a linear combination, a non-linear combination, a product, etc.) of the trajectory metric and the speed adjustment parameter. The speed adjustment parameter can be used to increase or decrease the pitch rating score based on a speed of the pitch. In some embodiments, the speed adjustment parameter decreases the pitch rating if the speed of the pitch is below a threshold value and increases the pitch rating if the speed is above the threshold value. The speed adjustment parameter can be a linear function of speed or it can include non-linear aspects. For example, the speed adjustment parameter can be, or can be approximated as, a polynomial function of speed. In some embodiments, the speed adjustment parameter is a scaling factor that is used to adjust the trajectory metric. For example, the pitch rating can be the product of the speed adjustment parameter and the trajectory metric, with possible additional scaling factors (e.g., to result in a targeted range of values for the pitch rating) and/or offset adjustment (e.g., to result in a targeted mean, median, mode, or midpoint of the targeted ranges for the pitch rating).

In some implementations, the pitch rating can incorporate additional or different parameters. For example, the final location component of the pitch trajectory can be adjusted by weighting values differently depending on a pitch being in or out of a strike zone. As another example, the contribution of the horizontal break component to the pitch rating can be adjusted to increase or decrease the pitch rating scores for particular breaking pitches, such as the slider, whose quality depends at least in part on horizontal movement in addition to vertical movement. As another example, the acceleration of pitches (e.g., as compared to predicted acceleration from gravitational forces) can be used to adjust the pitch rating to account for pitch movement relative to a batter, home base, and the like. As another example, the speed and/or acceleration of the pitch along one or more dimensions can be incorporated into the pitch rating model. This can improve the value of the pitch rating for pitches with relatively small breaks, such as fastballs or change-ups, for example. Accordingly, the pitch rating can be configured to provide an output indicative of a quality of a variety of pitches, from curveballs to sliders to fastballs. In addition, the pitch rating can be used to classify pitches by analyzing one or more pitch parameters and determining a likelihood that the pitch is of a certain type (e.g., curveball, slider, fastball, change-up, etc.). The pitch rating can also be used in conjunction with many detection and measurement tools currently available in baseball stadiums (e.g., PITCHf/x, TrackMan, etc.).

In a first aspect, a system is provided for determining a pitch rating for a pitch in baseball, the pitch rating indicative of a quality of the pitch. The system includes a detection system configured to detect a pitched ball at a point in time after release of the pitch and to determine a position of the ball. The system also includes a pitch quantification system with one or more hardware processors. The pitch quantification system includes a flight path module configured to receive from the detection system the position of the ball and to determine a path of the ball. The pitch quantification system also includes a pitch parameter module configured to receive the path of the ball from the flight path module and to extract parameters corresponding to properties of the path of the ball. The pitch quantification system also includes a pitch rating module configured to use the one or more hardware processors to calculate the pitch rating indicative of the quality of the pitch, the pitch rating based at least in part on the extracted parameters.

In some embodiments of the first aspect, the system also includes a display system configured to display the pitch rating. In some embodiments of the first aspect, the detection system comprises a Doppler radar system. In some embodiments of the first aspect, the detection system comprises an emitting antenna and a receiving antenna. In a further embodiment, the antennas comprise planar array antennas. In some embodiments of the first aspect, the detection system comprises a plurality of video cameras and a position extraction module configured to analyze images from the plurality of video cameras to extract the position of the ball.

In some embodiments of the first aspect, the parameters extracted by the pitch parameter module include a maximum height of the ball, an initial height of the ball at a point of release by a pitcher, a position of the ball at the maximum height, and a final location of the ball at home plate. In a further embodiment, the pitch rating module includes coefficients associated with the extracted parameters. In yet a further embodiment, the pitch rating module is configured to determine a rise factor equal to a rise coefficient multiplied by the difference between the maximum height of the ball and the initial height of the ball; a breakpoint factor equal to a breakpoint coefficient multiplied by a breakpoint distance, the breakpoint distance equal to the horizontal distance traveled from the point of release by the pitcher to the position of the ball at the maximum height; a final location factor corresponding to a final location relative to home plate; a vertical break factor equal to a vertical break coefficient multiplied by the maximum height of the ball and the final height of the ball; a horizontal break factor equal to a horizontal break coefficient multiplied by a horizontal deviation from a straight line path, wherein the pitch rating is equal to a sum of the rise factor, the breakpoint factor, the final location factor, the vertical break factor, and the horizontal break factor. In yet a further embodiment, the pitch rating is equal to a linear combination of a trajectory metric and a speed adjustment factor, the trajectory metric comprising the sum of the rise factor, the breakpoint factor, the final location factor, the vertical break factor, and the horizontal break factor. In yet a further embodiment, the speed adjustment factor is equal to an adjusted speed of the pitch multiplied by a speed adjustment coefficient. In a further embodiment, the rise coefficient, the breakpoint coefficient, the final location coefficient, the vertical break coefficient, and the horizontal break coefficient are configured such that the pitch rating is statistically correlated to scores for a sample of pitches. In some embodiments, the scores for the sample of pitches are provided by one or more pitching or baseball experts.

In some embodiments of the first aspect, the pitch rating is configured so that a majority of pitches have a value between −10 and 10. In a further embodiment of the first aspect, the pitch rating is not constrained to be between −10 and 10, and can have any value including numbers below −10 and numbers above 10. In some embodiments of the first aspect, the pitch rating is configured so that a majority of pitches have a value between 0 and 10. In some embodiments of the first aspect, the pitch rating is configured so that a majority of pitches have a value between 0 and 100.

In some embodiments of the first aspect, the system is configured to determine the pitch rating in real time. In some embodiments of the first aspect, wherein the system is configured to determine the pitch rating for at least 25 pitches in less than 1 second based on data for the at least 25 pitches provided by the detection system.

In a second aspect, a radar gun is provided that incorporates the pitch quantification systems described herein.

In a third aspect, a method of calculating a pitch rating is provided using the pitch quantification systems described herein.

In a fourth aspect, a system is provided for assigning a pitch rating to a pitch in baseball. The system includes a flight path module configured to analyze a flight path of a ball. The system includes a pitch parameter module configured to extract parameters related to the flight path of the ball. The system includes a pitch rating module configured to determine the pitch rating based at least in part on a pitch model which provides a model for combining the extracted parameters to determine the pitch rating.

In some embodiments of the fourth aspect, the pitch is a breaking pitch. In some embodiments of the fourth aspect, the pitch is a non-breaking pitch.

In some embodiments of the fourth aspect, the system includes a detection system configured to detect a position, velocity, and acceleration of the ball at a point in time. In some embodiments of the fourth aspect, the pitch parameter module calculates a position of the ball as a function of time or at a plurality of points in time. In some embodiments of the fourth aspect, the pitch parameter module calculates a velocity of the ball as a function of time or at a plurality of points in time. In some embodiments of the fourth aspect, the pitch parameter module calculates an acceleration of the ball as a function of time or at a plurality of points in time. In some embodiments of the fourth aspect, the pitch parameter module determines a position of the ball in 3 dimensions as a function of time or at a plurality of points in time. In a further embodiment of the fourth aspect, the pitch parameter module reduces the dimensionality of the position of the ball to a horizontal and a vertical dimension as a function of time or at a plurality of points in time.

In some embodiments of the fourth aspect, the pitch rating module includes accounts for properties of a batter in determining the pitch rating. In a further embodiment of the fourth aspect, the properties of the batter include a handedness of the batter. In some embodiments of the fourth aspect, the pitch rating module accounts for pitch placement in determining the pitch rating. In a further embodiment of the fourth aspect, the pitch rating module accounts for a result of the pitch in determining the pitch rating.

In a fifth aspect, a system is provided for determining a pitch rating for a pitch in baseball, the pitch rating indicative of a quality of the pitch. The system includes a detection system configured to detect a ball in flight and to determine a position and a speed of the ball. The system also includes a pitch quantification system having one or more hardware processors. The pitch quantification system includes a flight path module configured to receive from the detection system the position of the ball and to determine information representative of a flight path of the ball. The pitch quantification system includes a pitch parameter module configured to receive the information representative of the flight path of the ball from the flight path module and to generate pitch parameters corresponding to properties of the path of the ball the generated pitch parameters including a rise component, a breakpoint component, a vertical break component, a horizontal break component, and a final location component. The pitch quantification system also includes a pitch rating module. The pitch rating module is configured to determine a trajectory metric as a linear combination of the generated pitch parameters; to determine a speed adjustment parameter by taking a difference between the speed of the ball and a speed threshold; and to calculate the pitch rating indicative of the quality of the pitch, the pitch rating equal to a mathematical combination of the trajectory metric and the speed adjustment parameter.

In some embodiments of the fifth aspect, the system includes a display system configured to display the pitch rating. In some embodiments of the fifth aspect, the detection system comprises a Doppler radar system. In some embodiments of the fifth aspect, the detection system includes an emitting antenna and a receiving antenna. In a further embodiment, the antennas are planar array antennas.

In some embodiments of the fifth aspect, the pitch rating module includes coefficients associated with each of the generated pitch parameters. In a further embodiment, the coefficients are configured so that variations in the final location component affect the calculated pitch rating more than variations in the rise component. In yet another further embodiment, the coefficients are configured so that variations in the final location component affect the calculated pitch rating more than variations in the other components. In a further embodiment, the pitch rating module is configured to determine the trajectory metric equal to a sum of the respective products of the rise component and a rise coefficient; the breakpoint component and a breaking point coefficient; the vertical break component and a vertical break coefficient; the horizontal break component and a horizontal break coefficient; and the final location component and a final location component coefficient. In another further embodiment, the pitch rating module is further configured to determine the speed adjustment parameter is equal to a speed of the pitch minus a speed threshold value so that speeds above the threshold value increase the value of the pitch rating and speeds below decrease the value of the pitch rating. In a further embodiment, the pitch rating module is configured to calculate the pitch rating as a sum of a scaled trajectory metric, a scaled speed adjustment parameter, and a rating offset, the scaled trajectory metric equal to the trajectory metric multiplied by a trajectory scaling factor and the scaled speed adjustment parameter equal to the speed adjustment parameter multiplied by a speed adjustment scaling factor. In a further embodiment, the pitch rating is configured to have a value such that a majority of pitches have a value between −10 and 10. In a further embodiment, the rise coefficient, the breakpoint coefficient, the vertical break coefficient, the horizontal break coefficient, and the final location coefficient are configured such that the pitch rating is statistically correlated to scores for a sample of pitches, the scores for the sample of pitches provided by one or more experts. In a further embodiment, the rise coefficient and the final location coefficient are less than 0. In yet a further embodiment, the breakpoint coefficient, the horizontal break coefficient, and the vertical break coefficient are greater than 0.

In some embodiments of the fifth aspect, the system is configured to determine the pitch rating in real time. In some embodiments of the fifth aspect, the system is configured to determine the pitch rating for at least 25 pitches in less than 1 second based on data for the at least 25 pitches provided by the detection system. In some embodiments of the fifth aspect, the detection system comprises a plurality of video cameras and a position extraction module configured to analyze the images from the plurality of video cameras to extract a position of the ball, a velocity vector of the ball, and an acceleration vector of the ball at a point in time after the pitch has been released. In some embodiments of the fifth aspect, the system is configured to determine the pitch rating for all pitches in a game in less than 1 hour based on data for all the pitches in a game provided by the detection system. In some embodiments of the fifth aspect, the pitch rating is equal to a linear combination of the trajectory metric and the speed adjustment parameter.

In a sixth aspect, a system is provided for determining a pitch rating for a pitch in baseball. The system includes a flight path module configured to analyze a flight path of a ball. The system also includes a pitch parameter module configured to extract parameters related to the flight path of the ball. The system also includes a pitch rating module configured to determine the pitch rating based at least in part on a pitch model which provides a model for combining the extracted parameters to determine the pitch rating. The pitch rating comprises a mathematical combination of the extracted parameters and a speed of the pitch.

In some embodiments of the sixth aspect, the pitch is a breaking pitch. In some embodiments of the sixth aspect, the pitch is a non-breaking pitch. In some embodiments of the sixth aspect, the system comprises a detection system configured to detect a position of the ball as a function of time or at a plurality of points in time. In some embodiments of the sixth aspect, the pitch parameter module extracts the velocity of the ball as a function of time or at a plurality of points in time. In some embodiments of the sixth aspect, the pitch parameter module extracts the acceleration of the ball as a function of time or at a plurality of points in time. In some embodiments of the sixth aspect, the pitch parameter module extracts the position of the ball in 3 dimensions as a function of time or at a plurality of points in time. In a further embodiment, the pitch parameter module reduces the dimensionality of the position of the ball to a horizontal and a vertical dimension as a function of time or at a plurality of points in time.

In some embodiments of the sixth aspect, the pitch model accounts for properties of a batter in determining the pitch rating. In a further embodiment, the properties of the batter include a handedness of the batter. In a further embodiment, the pitch model accounts for pitch placement relative to a strike zone of the batter in determining the pitch rating. In a further embodiment, the pitch placement includes data corresponding to a horizontal position of the ball relative to a location of home base and relative to the batter.

In some embodiments of the sixth aspect, the pitch rating module can be configured to be modified through multiple inputs. In a further embodiment, the multiple inputs can be provided by one or more users. In a further embodiment, the multiple inputs can be received through a communication system. In a further embodiment, the multiple inputs can be sent to one or more users to modify a pitch rating system in use by the one or more users.

In some embodiments of the sixth aspect, the pitch model is modified according to input from one or more pitching experts. In a further embodiment, the modified pitch model is not shared with other pitch rating systems.

In some embodiments of the sixth aspect, the pitch model is configured to be inaccessible through normal use of the system. In some embodiments of the sixth aspect, the system can be configured to share the pitch model with selected pitch rating systems. In some embodiments of the sixth aspect, the system can be configured to share the pitch model with selected parties. In a further embodiment, the selected parties include scouts or coaches within a particular baseball organization. In yet another further embodiment, the system is configured to not share the pitch model with parties outside the particular baseball organization.

In a seventh aspect, a computer-implemented method is provided that is implemented by one or more hardware computing devices configured with specific executable instructions. The method includes electronically receiving ball flight data indicating at least a position and a speed of a ball in flight. The method also includes determining information representative of a flight path of the ball based at least in part on the received ball flight data. The method also includes generating pitch parameters based at least in part on one or more properties of the determined information representative of the flight path of the ball, the generated pitch parameters including at least a rise component, a breakpoint component, a vertical break component, a horizontal break component, and a final location component. The method also includes determining a trajectory metric based at least in part on each of the generated pitch parameters. The method also includes determining a speed adjustment parameter based at least in part by comparing the speed of the ball to an electronically stored speed threshold. The method also includes generating a pitch rating indicative of a pitch quality associated with the flight path, wherein generating the pitch rating comprises mathematically combining the speed adjustment parameter with the determined trajectory metric.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION

Figure 1A:
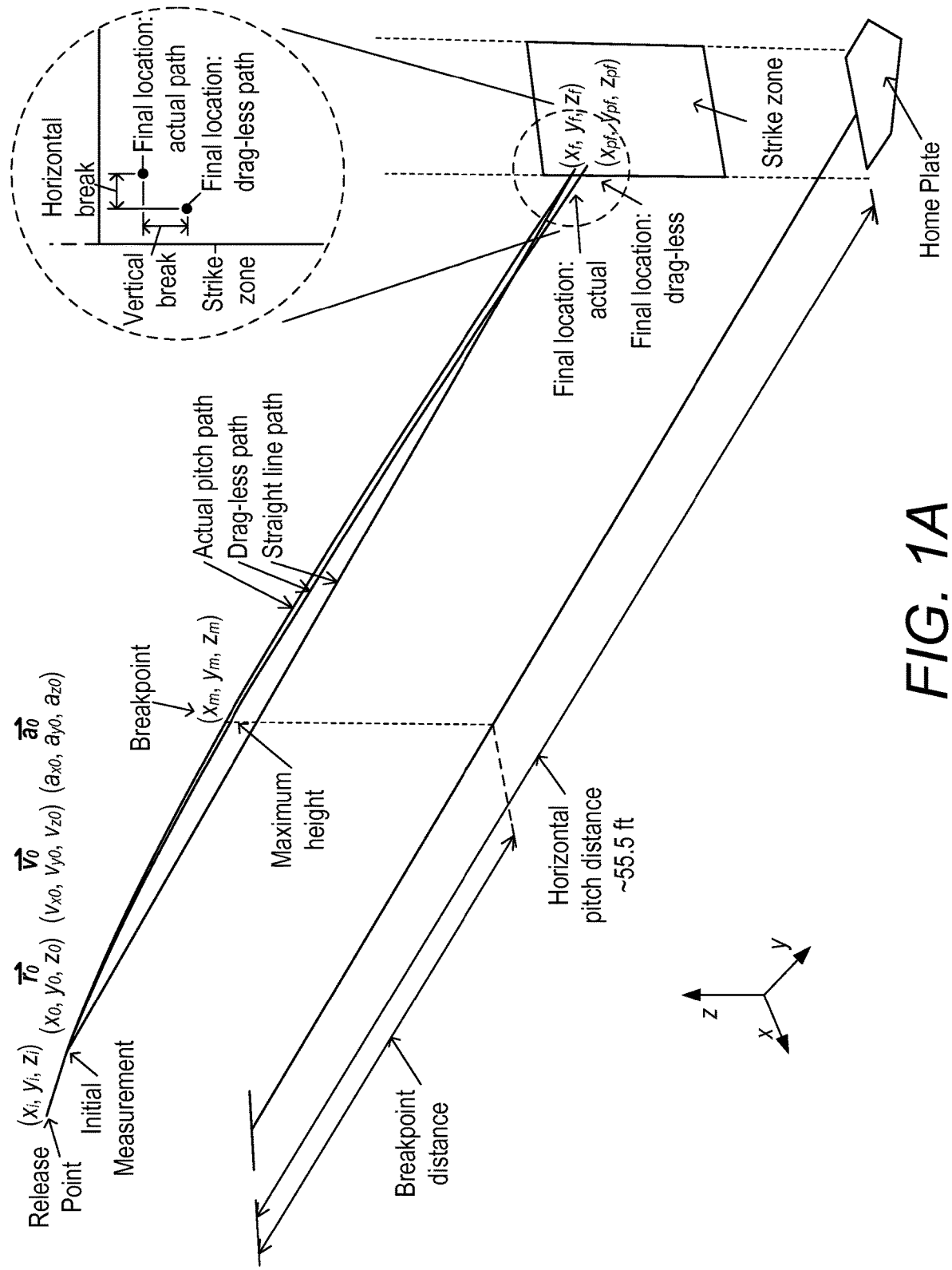
FIG. 1A illustrates an example of a flight path of a pitch.

Miles per hour has been the rating system that pitchers all over the world are held to for their fastball. Having a standardized scale makes it easy to compare, value, and track progress of different pitchers in a variety of locations and situations. Having a metric that applies to everyone allows coaches, scouts, players, and fans to easily compare pitchers and recognize talent. Thus the metric for the fastball, the speed, has become a worldwide standard. However, there is no similar standard generally applicable for all pitches, including fastballs, breaking balls, and other types of breaking and non-breaking pitches. As an example, a curveball is a pitch that begins straight, like a fastball, and then suddenly moves vertically downwards, or breaks, due to spin placed on the ball. The curveball's effectiveness is mainly in the difference of movement, an unexpected change from a fastball, which is a more frequently occurring pitch. In some embodiments, the systems and methods disclosed herein can advantageously provide an index, or pitch rating, for quantifying the quality of pitches, including breaking pitches (e.g., curveballs, sliders, etc.) and non-breaking pitches (e.g., fastballs, change-ups, etc.). The pitch rating can be an analogous metric for breaking pitches as the speed metric is for fastballs. The pitch rating, however, can be applicable and valuable for both breaking pitches and non-breaking pitches, whereas the relevance of the speed metric is primarily limited to fastballs. The pitch rating can be configured to incorporate the speed metric into its calculation, for example, so that it can provide a relevant and useful metric for all pitches, breaking and non-breaking pitches.

As used herein, the term breaking pitch is to be understood to have its plain and ordinary meaning and includes, for example and without limitation, pitches which deviate from an expected flight path due at least in part to a spin on the ball. A breaking pitch includes at least curveballs, sliders, cutters, etc. As used herein, the term non-breaking pitch is to be understood to have its plain and ordinary meaning and includes, for example and without limitation, pitches which follow an expected flight path from a pitcher to a batter. A non-breaking pitch includes at least fastballs, changeup balls, etc. Accordingly, nothing in this disclosure should be interpreted as limiting the pitch rating to breaking pitches or to a particular category of pitches. The pitch rating systems and methods can be applied to, for example and without limitation, fastballs, four-seam fastballs, two-seam fastballs, cutters (or cut fastballs), forkballs, splitters, sinkers, breaking balls, curve balls, sliders, screw balls, changeup balls, palm balls, circle changes, super changeups, knuckleballs, eephus pitches, spitballs, gyro balls, shuuto balls, etc.

As is apparent from the disclosure herein, the pitch rating can be configured to provide a relevant metric for any pitch, whether breaking or non-breaking, and to be independent of particular definitions or categorizations. Thus, regardless of how a pitch is categorized, the pitch rating systems disclosed herein can be configured to analyze the flight of the ball and to determine the relevant pitch rating. This can be useful where observers disagree as to the classification of a pitch as the pitch rating can be configured to be independent of this classification.

FIG. 1A illustrates an example of a flight path of a pitch. In this diagram, the pitcher is situated on the upper left-hand side of the diagram and throws the ball to the lower-right toward home plate. For ease of reference, the coordinate system used in this illustration has the positive x-axis increasing from the pitcher's left to right, the positive y-axis increasing in the direction from the pitcher to home plate, and the positive z-axis points up (e.g., anti-parallel to the gravity vector). In the diagram, the pitcher releases the ball at the release point (e.g., having coordinates $x_i$, $y_i$, $z_i$). In the diagram, an initial measurement is made after the release point (e.g., having coordinates $x_0$, $y_0$, $z_0$). In some embodiments, the initial measurement can include the position, velocity ($v_{x0}$, $v_{y0}$, $v_{z0}$), and/or acceleration ($a_{x0}$, $a_{y0}$, $a_{z0}$) of the ball at the time of the measurement. In some embodiments, the initial measurement can be made at the release point so that the release point and the initial measurement point are the same. After releasing the ball, the ball has an upward trajectory and reaches a maximum height after which it begins its descent. The point of maximum height has the coordinates ($x_m$, $y_m$, $z_m$). This point can also be referred to as the breakpoint. For some pitches, the ball does not have an upward trajectory after release. The breakpoint can coincide with the release point, an initial measurement point, or some other location. After reaching the maximum height, the ball begins to travel downward. In some cases, the acceleration is different than what would be expected due to the force of gravity due at least in part to aerodynamic effects on the ball (e.g., drag forces and Magnus effects). In some cases, the ball follows a trajectory that corresponds to a non-breaking pitch (e.g., where the downward acceleration is close to that of gravity). The path of the ball can also include a lateral component (e.g., movement in the x-direction). The position of the ball when it reaches the batter is referred to as the final location having coordinates ($x_f$, $y_f$, $z_f$).

The breakpoint distance can be the horizontal distance from the release point or initial measurement of the pitch to the breakpoint (e.g., $y_m-y_i$ or $y_m-y_0$). The rise can be the difference in height between the release point or initial position measurement and the height of the ball at the breakpoint (e.g., $z_m-z_i$ or $z_m-z_0$). The vertical break can be the difference in height between the maximum height of the ball and the final location of the ball (e.g., $z_m-z_f$) or the difference in height between the actual final location of the ball (e.g., $z_f$) and a predicted final location of the ball (e.g., $z_{pf}$) where the prediction is based on a generated flight path that ignores one or more forces (e.g., drag forces and/or the Magnus effect). Similarly, the horizontal break can be the horizontal difference in location between a predicted final location and the actual final location (e.g., $x_f-x_{pf}$). The horizontal component of the predicted final location (e.g., $x_{pf}$) can be calculated based on a predicted straight line path based on the initial measurement of the position and the horizontal component of the initial measured velocity (e.g., $v_{x0}$). This predicted final location can include the initial measurement of horizontal acceleration in some implementations. As described in this paragraph, the parameters of the flight path of the pitched baseball can be parameters generated through the use of one or more equations to estimate the actual flight path. For example, where the flight path of the pitched baseball is sampled sparsely by a detection system and/or where there is only an initial measurement of position, velocity, and acceleration, the flight path of the ball can be generated by applying one or more equations that incorporate effects of forces on the ball to estimate the actual flight path. This generated flight path can be analyzed to generate the parameters of interest for the pitch (e.g., release point, breakpoint, maximum height, final location, etc.).

Figure 1B:
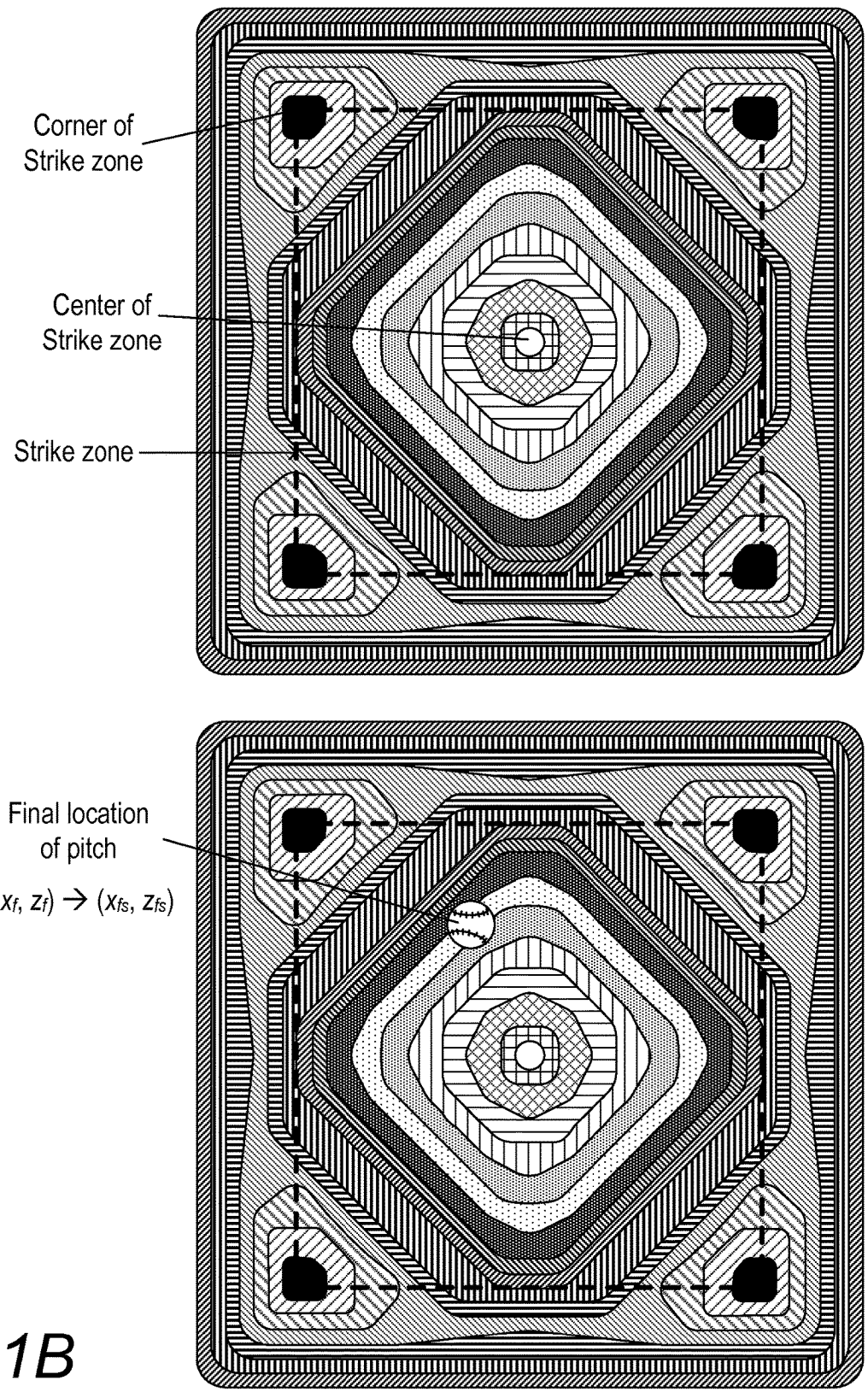
FIG. 1B illustrates an example for assigning values for a final location of a pitch.

FIG. 1B illustrates an example of assigning a value to a final location component of a pitch. To assign a value for the final location, the final location of the pitch is determined using the generated flight path information. The final location can be determined using absolute coordinates and then compared to the location of the strike zone to determine the final location value. For example, the strike zone can be defined for each batter or a universal strike zone can be defined. The final location of the pitch, or the x and z coordinates of the ball when it breaks the plane of the front of home plate ($x_f$, $z_f$), can then be used to determine the final location of the ball within the strike zone (e.g., $x_{fs}$, $z_{fs}$). For example, a transformation can be done from a coordinate system for the pitch to a coordinate system defined with respect to the strike zone. In some embodiments, the center of the strike zone can be an origin of this transformed coordinate system. Distances in this transformed coordinate system can be expressed as units of measurement (e.g., inches, feet, centimeters) or as a proportion of a distance from a center of the strike zone to an edge or corner of the strike zone (e.g., a value of 0 is at the center of the strike zone and a value of 1 is at a corner of the strike zone and a value between 0 and 1 represents a fraction of the distance between the center and the corner). A final location function can then be used to determine a value for the final location component of the pitch (e.g., $f(x_{fs}, z_{fs})$). The final location function can be a smooth function with an output that varies over locations within and without the strike zone. In some embodiments, the final location function has a discontinuity at the boundary of the strike zone (e.g., the derivative of the final location function is not continuous). The final location function can be a lookup table that assigns discrete values for the final location based on the final location in the strike zone. For example, as illustrated in FIG. 1B, different regions can be assigned different values, where this is represented by different cross-hatching designs for different areas around the strike zone. In this example, the pitches that have a final location within an area marked with a particular cross-hatching will be assigned the same value for the final location. In some embodiments, the final location has a minimum or maximum at or near the center of the strike zone, and maximums or minimums at the corners of the strike zone.

The value for the final location component of the pitch can be configured to reflect pitch quality. For example, pitches that cross home plate near a center of the strike zone, the final location component can have a relatively large number (where the value of the final location component is used to decrease the pitch rating), with a maximum value at an exact center of the strike zone. Thus, a pitch down the middle of the plate will have a value of the final location component that reduces the pitch quality rating more than a pitch that is near a corner or edge of the strike zone. In some embodiments, the location of the maximum value can be adjusted. For example, the value can be moved up, down, left or right. This can be done to account for hitter preferences, coach preferences, a requested target by the catcher, an intended final location by the pitcher, or the like. The final location value can decrease as distance from the location of the maximum increases. The final location value can have a minimum value or values at the edges and/or corners of the strike zone. In some embodiments, the minimum value or values of the final location component is assigned for pitches that cross home plate at or near the corners of the strike zone. The final location value can be configured to decrease with increasing distance from the center of the strike zone when the pitch has a final location within the strike zone. For pitches that have a final location outside of the strike zone, the final location value can increase with increasing distance from the strike zone. For example, a wild pitch (e.g., one very far from the strike zone) can have a relatively large value for the final location component. As described herein, this can result in a relatively large negative effect on the pitch rating.

With reference to FIG. 1A, the breakpoint distance refers herein to the horizontal distance (e.g., along the y-axis) from the release point to the point where the ball reaches its maximum height, which in this coordinate system equals $y_m - y_i$. The rise of the pitch refers herein to the vertical distance the ball travels from the release point to the maximum height, which in this coordinate system equals $z_m - z_i$. The vertical break refers herein to the difference between the maximum height and the final height, which in this coordinate system equals $z_m - z_f$. The horizontal break refers herein to the difference between a projected straight line path for a pitch and a final location of the pitch, which in this coordinate system equals $x_f - x_s$. The total horizontal distance traveled by the ball, $y_f - y_0$, may depend on the skill level (e.g., little league versus professional baseball), but in most circumstances the value will be approximately 55 ft. (e.g., a typical release point for a major league pitcher). As is evident from this disclosure, the horizontal and vertical breaks can be useful for breaking and non-breaking pitches. For example, fastballs and curveballs will have different horizontal and/or vertical breaks. Accordingly, pitch rating systems and methods disclosed herein can be pitch-agnostic, able to determine a pitch rating applicable to breaking and non-breaking pitches.

In some embodiments, the instantaneous and/or average velocity and/or acceleration can be measured or determined based at least in part on the flight path of the ball. In some embodiments, the velocity and/or acceleration vectors can be used in the determination of the pitch rating. Incorporating the velocity and/or acceleration can be useful for assigning a pitch rating for pitches with little or no breaking, such as fastballs or change-ups. It may enable the pitch rating calculation to provide relevant and/or accurate pitch ratings for a variety of pitches, including both breaking and non-breaking pitches.

Figure 1C:
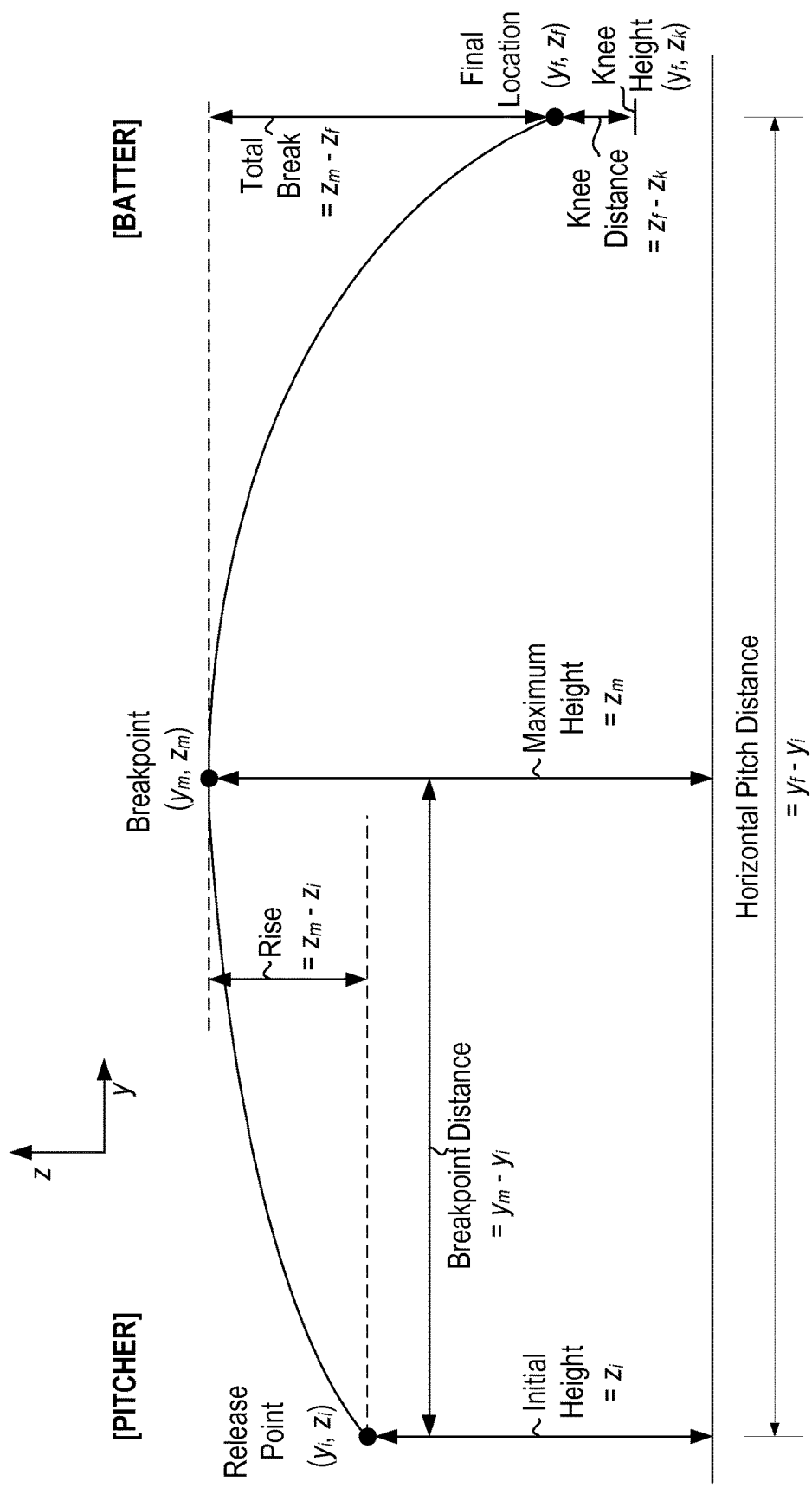
FIG. 1C illustrates an example of a flight path of a pitch reduced to two dimensions.

In some embodiments, the flight path of a pitch can be reduced to two dimensions, as illustrated by the diagram in FIG. 1C. The components of the flight path can be similar to those described with reference to FIG. 1A. The final location can be adjusted to be relative to a knee height, as shown in FIG. 1C, or it can be adjusted relative to a distance from a middle of the strike zone (e.g., similar to the description above with reference to FIG. 1B, but reduced to one dimension).

For example, the diagram in FIG. 1C represents the pitcher as being situated on the left-hand side of the figure and throwing the ball to the right toward the catcher and batter. For ease of reference, the coordinate system used in this illustration has the positive y-axis increasing from the pitcher in the direction of the batter and the positive z-axis pointing anti-parallel to the gravity vector (e.g., the z-axis points up). In the diagram, the pitcher releases the ball at the release point (e.g., having coordinates $y_i$, $z_i$) After releasing the ball, the ball has an upward trajectory and reaches a maximum height after which it begins its descent. For some pitches, the ball does not have an upward trajectory after the pitcher releases the ball. The point of maximum height has the coordinates ($y_m$, $z_m$). After reaching the maximum height, the ball can break, or begin to travel downward and accelerate with an acceleration that is faster than the acceleration of gravity due at least in part to aerodynamic effects on the ball (e.g., its speed and spin). For some pitches, after reaching the maximum height, the ball can follow a trajectory which corresponds to a non-breaking pitch (e.g., where the downward acceleration is close to that of gravity). Some pitches can follow a trajectory where the downward acceleration is less than the acceleration of gravity due at least in part to aerodynamic effects on the ball (e.g., its speed and spin, such as for a pitch with backspin). The position of the ball when it reaches the batter is referred to as the final location having coordinates ($y_f$, $z_f$).

In this two-dimensional example, the breakpoint distance refers to the horizontal distance (e.g., along the y-axis) from the release point to the point where the ball reaches its maximum height, which in this coordinate system equals $y_m-y_i$. The rise of the pitch refers to the vertical distance the ball travels from the release point to the maximum height, which in this coordinate system equals $z_m-z_i$. The total break refers to the difference between the maximum height and the final height, which in this coordinate system equals $z_m-z_f$. In some implementations, it is useful to compare the final height, $z_f$, to an estimated knee height, $z_k$, (e.g., the bottom of the strike zone). The knee distance refers to the difference between the final height and the knee distance, which in this coordinate system equals $z_f-z_k$. The knee distance may also refer to the absolute value of this difference (e.g $|z_f-z_k|$). The total horizontal distance traveled by the ball, $x_f$, may depend on the skill level (e.g., little league versus professional baseball), but in most circumstances the value will be approximately 55 ft.

Example Pitch Rating Systems

Figure 2:
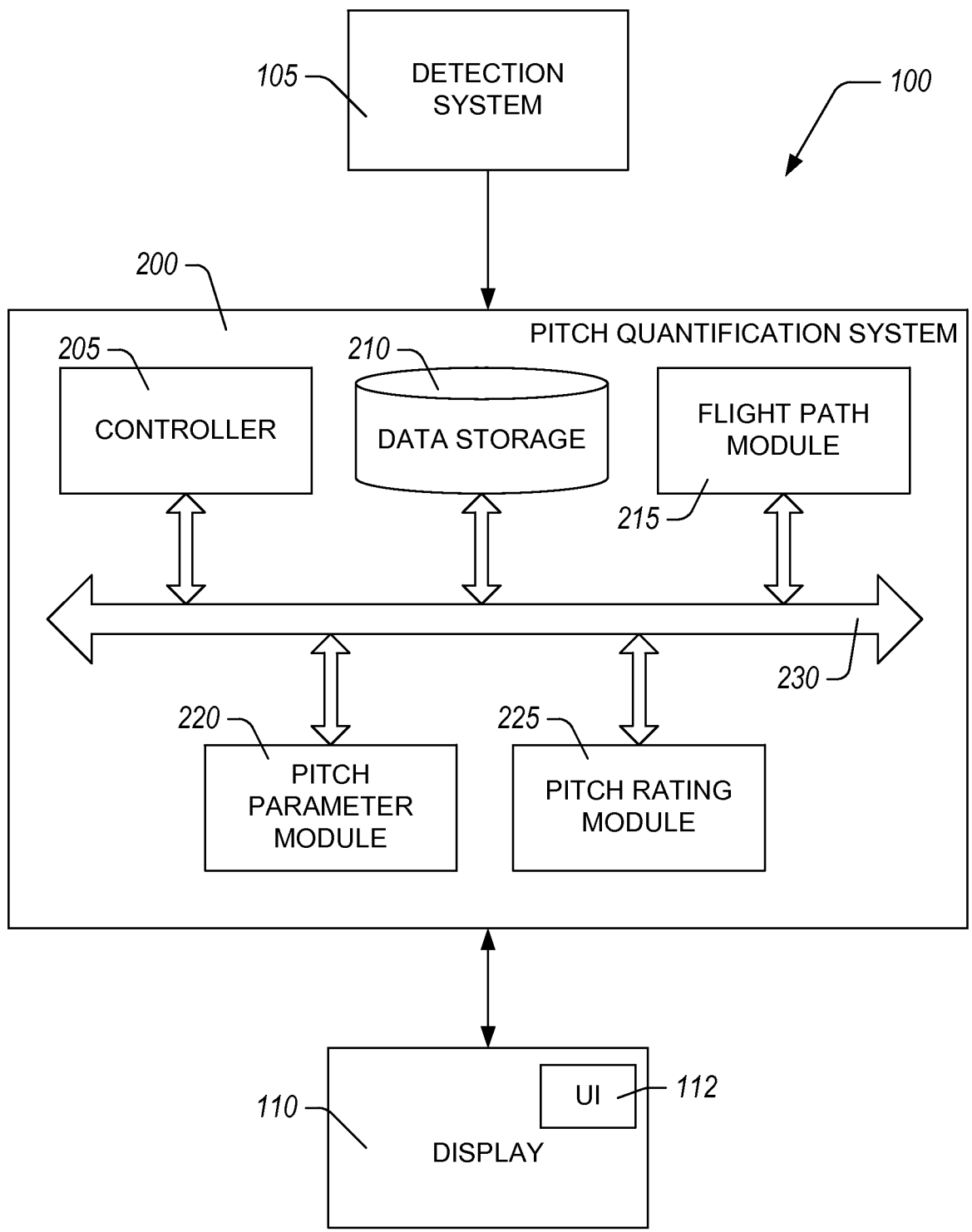
FIG. 2 illustrates a block diagram of an example system for assigning in real time a pitch rating to a pitch in baseball.

FIG. 2 illustrates a block diagram of an example system 100 for assigning in real time a pitch rating to a pitch in baseball. The system 100 includes a detection system 105, a pitch quantification system 200, and an optional display 110 with user interface 112. The system 100 is configured to acquire and process data regarding a path of a pitch and determine a pitch rating based at least in part on the acquired and processed path data. The system 100 can be configured to provide the pitch rating in real time or in near real time. As used in this context, real time or near real time refers to providing the pitch rating after a relatively short amount of time has passed since the pitch occurred, where the amount of time can be about 10 seconds, about 5 seconds, about 2 seconds, about 1 second, about 0.5 seconds, or about 0.3 seconds.

The system 100 includes the detection system 105 configured to detect the ball in flight and to determine the position, velocity, and/or acceleration of the ball. The detection system 105 can employ any method for determining the position of the ball including tracking sensor data included on the ball, using radar systems, using imaging systems, and the like. The detection system 105 can be configured to provide position, velocity, and/or acceleration data at a point in time or at a plurality of points in time. In some embodiments, the frequency of the position data can vary can be provided at time intervals where the time intervals are at least about 1 µs and/or less than about 0.2 s, at least about 10 µs and/or less than about 0.1 s, at least about 100 µs and/or less than about 50 ms, at least about 500 µs and/or less than about 20 ms, or at least about 1 ms and/or less than about 10 ms. In some embodiments, the detection system 105 can provide information about the strike zone at home plate. For example, the detection system 105 can provide upper and lower bounds of the strike zone at home plate. In some embodiments, the strike zone can also be defined as the width of home plate. This information can be provided by the detection system 105. In some embodiments, the strike zone can be defined as the width of home plate plus the radius and/or diameter of the baseball on either side of home plate. In some embodiments, the strike zone can be adjusted based on calls of the umpire (e.g., moving the strike zone boundaries to account for called strikes and called balls).

The detection system 105 can include a Doppler radar system having one or more antennas. The Doppler radar system can be used to track the position of the baseball on its path from the pitcher to the catcher. An example of such a Doppler radar system is disclosed in U.S. Pat. Pub. No. 2007/0293331 to Tuxen, published Dec. 20, 2007, the entire contents of which is incorporated by reference herein.

The detection system 105 can include a plurality of video cameras and an object tracking system configured to extract the position of the ball from the video provided by the plurality of video cameras. An example of such a video system which provides object tracking is disclosed in U.S. Pat. No. 8,335,345 to White et al., issued Dec. 18, 2012, the entire contents of which is incorporated by reference herein.

The system 100 includes the pitch quantification system 200 configured to receive the position, velocity, and/or acceleration data from the detection system 105 and to determine the pitch rating in real time or near real time. The pitch quantification system 200 includes a controller 205 comprising one or more hardware processors. The pitch quantification system 200 includes data storage 210 comprising non-transitory memory. The pitch quantification system 200 includes modules 215, 220, and 225 configured to read, to process, and to analyze the position, velocity, and/or acceleration data to determine the pitch rating for a particular pitch. In some embodiments, one or more of the modules 215, 220, or 225 utilizes the controller 205 and/or data storage 210 to accomplish its functionality. The controller 205, data storage 210, and modules 215, 220, and 225 can be configured to communicate with one another over communications bus 230. The communications bus 230 can be any standard communications bus. The communications bus 230 can at least partially include a networked connection, using either wireless or wired connections. The communication bus 230 can include communication between processes or functions being executed on one or more computing devices. In some embodiments, the pitch quantification system 200 comprises a distributed computing system.

The pitch quantification system 200 includes the flight path module 215 configured to generate a flight path of the ball based on the position, velocity, and/or acceleration data received from the detection module 105. In some embodiments, the flight path module 215 generates a map of the ball as a function of position and time. The map can be represented using three spatial dimensions (e.g., x, y, and z coordinates) or the flight path module 215 can determine a two-dimensional plane onto which the position information of the ball is mapped. For example, to simplify the calculations for pitch rating, the flight path module 215 can determine a plane which increases or maximizes the total break in that plane. This two-dimensional plane can be used to represent the flight path of the ball.

The flight path module 215 can be configured to determine information representative of a flight path of a pitch. For example, the information representative of the flight path can include a release point of the pitch, a location of an initial measurement of the pitch, a point of maximum height of a pitch, a final location of a pitch, a deviation from a predicted path, and the like. As another example, the information representative of the flight path can include a set of points representing the position of the ball at a plurality of points in time. The information can also include velocity information and/or acceleration information at one or more of the plurality of points in time.

In some embodiments, the flight path module 215 can be configured to determine the information representative of the flight path of the pitch using one or more equations. The one or more equations can be configured to generate information about the position, velocity, and/or acceleration of the ball at one or more positions or points in time after the ball has been released by the pitcher. The one or more equations can be used to generate a plurality of data points that represent the position of the ball at a plurality of points in time. The one or more equations can be configured to accept measured or calculated input (e.g., an initial position, velocity, and/or acceleration of the ball, a rate of spin of the ball, weather conditions, etc.) and determine information representative of the flight path without explicitly providing the flight path of the ball. For example, the one or more equations can accept input and output a release point of the pitch, a location of an initial measurement of the pitch, a point of maximum height of a pitch, a final location of a pitch, a deviation from a straight-line path, any combination of these, or the like. The one or more equations can be configured to determine the information representative of the flight path by calculating physical effects on the ball, such as gravitational forces, drag forces, Magnus forces, wind effects, etc.

In some embodiments, the detection system 105 provides the position of the ball as a function of time in such a way that the flight path module 215 does not perform any further processing on the data before being sent to the pitch parameter module 220. For example, the detection system 105 can be configured to provide position coordinates for the ball at a plurality of points in time. In some embodiments, the detection system 105 provides the position, velocity, acceleration, and/or spin rate of the ball at a point in time after release or at a particular distance from home plate (e.g., at a horizontal distance of about 50 ft. from home plate) and the flight path module 215 determines a flight path or trajectory of the ball to home plate using that initial information. The flight path module 215 can use any suitable equation to determine the flight path. In certain implementations, the flight path module 215 uses equations that account for drag forces (e.g., air resistance) and/or the Magnus effect (e.g., forces arising from air moving around a spinning object) on the ball. In some implementations, the flight path module 215 uses equations that ignore drag forces and/or the Magnus effect on the ball. For example, with reference to FIG. 1A, different flight paths are represented wherein a flight path can include factors that account for drag forces and/or Magnus effects. The flight path module 215 can be configured to generate a function that represents the position, velocity, acceleration, and/or spin rate of the ball as a function of time.

The pitch quantification system 200 includes the pitch parameter module 220 configured to extract pitch parameters based at least in part on the flight path provided by the flight path module 215 or the data provided by the detection system 105. The pitch parameter module 220 can be configured to extract, for example and without limitation, the release point, the break point, and/or the final location of the pitch. The pitch parameter module 220 can also be configured to derive pitch parameters from the provided data. For example, the pitch parameter module 220 can derive, for example and without limitation, the rise, breakpoint distance, vertical break, horizontal break, maximum height, velocity vector (as a function of position), and/or acceleration vector (as a function of position) of the pitch. In some embodiments, the pitch parameter module 220 can numerically or analytically calculate derivatives of the position data as a function of time or at a plurality of points in time to generate approximations of the instantaneous velocity and/or acceleration of the ball as a function of time and/or position. In some embodiments, the pitch parameter module 220 can extract additional information about the pitch, such as the rate of spin of the ball. In some implementations, the detection system 105 provides the rate of spin of the ball. In some embodiments, the pitch parameter module 220 can extract information about the pitch that provides position, velocity, and/or acceleration of the ball in 3 dimensions as a function of time and/or position. It is to be understood that velocity and acceleration can be represented as vectors and/or scalars.

The pitch quantification system 200 includes the pitch rating module 225 configured to use one or more of the parameters extracted by the pitch parameter module 220 to determine a pitch rating for the pitch. The pitch rating module 225 can utilize a pitch model to translate pitch parameters into a pitch rating. Each of the parameters used in the pitch model can have an associated coefficient, or weight factor, that scales the contribution of the parameter. The coefficients can be configured to provide a desirable and/or easily accessible or understandable scale for the pitch rating (e.g, the pitch rating is calibrated so that most pitches have a value between −10 to 10, 0 to 10, 0 to 100, 0 to 1, −1, 50 to 100, etc.). The pitch rating can have an ascending scale (e.g., higher numbers are better pitches) or a descending scale (e.g., lower numbers are better pitches). The pitch rating can be presented using any number of digits for accuracy, and can be rounded up or down for presentation (e.g., on a 10-point scale, the number can be displayed or presented with 2 decimal digits, such as a pitch rating of 9.67, or with 1 decimal digit, such as a pitch rating of 9.7). The coefficients can be configured to account for the use of a variety of units of measurement (e.g., feet, inches, meters, yards, etc.). The coefficients can be stored in data storage 210.

In certain embodiments, there are no constraints on the value of the pitch rating (e.g., the pitch rating can have any value from negative infinity to positive infinity). This can be advantageous where it is not desirable to imply that a pitch is "perfect" by assigning a maximum value to a pitch. For example, where the scale has a maximum value of 10 and a pitch receives or scores a pitch rating of 10, that rating may be seen to imply that the pitch was perfect. An unbounded scale for the pitch rating may more accurately reflect that pitches are not perfect, but that they can be comparably inferior or superior. In addition, as pitching and pitchers evolve with time, the unbounded scale can be used to compare whether pitching is improving on average over time. For example, this may provide an absolute scale that allows pitchers to be compared from different time frames or eras and that removes some of the elements which introduce uncertainty or subjectivity into comparisons of players from different eras. Judging a pitcher based on ERA or opposing players' batting averages may not be a good standard of comparison because hitting, fielding, and/or equipment have changed over time which affects these metrics. The pitch rating, however, may provide a metric that is relatively independent of these affects.

In some embodiments, the pitch rating can be constrained to have a value between a minimum and a maximum value (e.g., a minimum pitch rating is 0 and a maximum pitch rating is 100). The constraints can be hard limits that place a threshold value on the pitch rating, such that any pitch rating over the threshold is assigned the threshold value. The constraints can be asymptotic in nature, allowing the pitch rating to approach, but never reach the threshold values (unless rounded up or down based on numerical proximity to the upper or lower bound).

As an example, the pitch parameter module 220 can use a pitch model that uses the rise, breakpoint distance, horizontal break, vertical break, and final location (as described herein with reference to FIG. 1B) to determine the pitch rating. In implementations using two dimensions, the pitch model can set horizontal break to 0. For the example pitch model in three dimensions, the rise coefficient can be negative, the breaking point coefficient can be positive, the vertical break coefficient can be positive, the horizontal break coefficient can be positive and the final location coefficient can be negative. These ranges for the coefficients comport with expectation. For example, a negative rise coefficient makes sense because a pitch that has less rise is harder to hit because it is harder to identify as a curveball. The positive breaking point coefficient makes sense the larger the breaking point distance the less time a batter has to react to the break. The negative final location coefficient makes sense because the closer the ball is to the center of the plate the easier the pitch is to hit. The positive coefficients for vertical and horizontal breaks make sense because a pitch that breaks more is harder to hit. As is evident from the preceding discussion, one indication of a higher quality pitch is that it is harder to hit than a lower quality pitch. Another indication of a higher quality pitch is that it is more likely to have a favorable outcome for the pitcher (e.g., a strike rather than a hit or a ball) than a lower quality pitch.

As an example of the coefficients used in a pitch model which provides a pitch rating where the majority of pitches have a pitch rating between 0-100 can have a rise coefficient of −2.51 (where rise is measured in inches), a breakpoint distance coefficient of 1.88 (where breakpoint distance is measured in feet), a final location coefficient of −0.47 (where final location is measured as a distance from a knee height of a batter and is measured in inches), and a vertical break coefficient of 0.51 (where the total break is measured in feet). Such a model can use a coefficient of 0 for horizontal break. In some embodiments, the rise coefficient is between 1.2 and 3.8 where rise is measured in inches and the rating scores most pitches between 0 and 100, the breakpoint distance coefficient is between 1.4 and 2.4 where breakpoint distance is measured in feet, the knee distance coefficient is between −0.8 and −0.1 where the final location is measured in inches from a knee height, and the vertical break coefficient is between 0.4 and 0.7 where the total break is measured in feet. It is to be understood that the scale of the pitch rating can be changed by a multiplicative factor and that each coefficient in this case would be changed by the same multiplicative factor.

In some embodiments, the pitch rating module 225 uses other parameters in addition to or in place of the parameters identified above. For example, the pitch rating module 225 can use the pitcher as a parameter, the velocity (instantaneous or average), the acceleration (instantaneous or average), or different path-related parameters. In some embodiments, multiple parameters can be used and combined to derive other parameters indicative of a quality of a pitch. Similarly, the pitch rating model can be non-linear and can include interaction terms between the parameters and quadratic or higher power contributions.

As another example, the pitch rating module 225 can calculate a pitch rating for a particular pitch by combining components of the ball's trajectory, the components comprising rise, breaking point, vertical break, horizontal break, and final location of the pitch. This trajectory-based rating can be configured to relatively weight the contributions of the components to account for the contribution of each component to the pitch quality. For example, the final location component can be configured to have the largest effect on the pitch quality, followed by the vertical break. As another example, the rise component can be configured to have the smallest effect on the pitch quality, followed by the horizontal break. As used herein, a component has a relatively large effect on the pitch rating where typical pitch-to-pitch variations in that component result in relatively large changes in pitch quality (e.g., as for the final location component) or a relatively small effect on the pitch rating where typical pitch-to-pitch variations in that component result in relatively small changes in pitch quality (e.g., as for the rise component).

As another example, the pitch rating module 225 can calculate a pitch rating for a particular pitch by combining a pitch rating determined using components of the ball's trajectory with a speed of the pitch. For example, a method for combining a trajectory-based quality metric with speed can be to calculate a linear combination of the trajectory-based quality metric with a speed adjustment factor. This can allow for the pitch quality to be suitable for use with breaking and non-breaking pitches. In some embodiments, the trajectory-based quality metric can be scaled and added to a speed adjustment factor. The final result can be increased or decreased (e.g., through an additive multiplicative constant) to achieve a desired scale. In some embodiments, the speed adjustment factor is equal to the speed of the pitch minus a threshold speed, such that any speed above the threshold increases the pitch quality and any speed below the threshold decreases the pitch quality. The adjusted speed can also be scaled to achieve a desired or targeted effect on the speed adjusted pitch quality. Combining the trajectory-based quality metric with speed can be accomplished using other mathematical combinations including, for example and without limitation, non-linear combinations, calculating a product or ratio of the metric and speed, using a tailored function or look-up table to associate the trajectory-based quality metric and speed with a pitch rating, or the like.

As another example, the pitch rating can be equal to a scaled trajectory metric plus a scaled speed adjustment parameter plus a rating offset. The scaled trajectory metric, T, can be in the form of the equation:

$$T = C\text{rise}*R + C\text{bkpt}*B + C\text{vbk}*V + C\text{hbk}*H + C\text{loc}*L$$

where R is the value of the rise component of the trajectory, B is the value of the breaking point component of the trajectory, V is the value of the vertical break component of the trajectory, H is the value of the horizontal break component of the trajectory, and L is the value of the final location component of the trajectory. The coefficients Crise, Cbkpt, Cvbk, Chbk, Cloc correspond to scaling coefficients for the respective trajectory components rise, breaking point, vertical break, horizontal break, and final location. In some embodiments, the coefficient Crise can be configured such that an increase in the rise component results in a decrease in the trajectory metric. In some embodiments, the coefficient Cbkpt can be configured such that an increase in the distance from the pitcher to the breaking point results in an increase in the trajectory metric. In some embodiments, the coefficient Cvbk can be configured such that an increase in the vertical break component results in an increase in the trajectory metric. Similarly, in some embodiments, the coefficient Chbk can be configured such that an increase in the horizontal break component results in an increase in the trajectory metric. In some embodiments, the final location component can be configured to have a scale based on a location of the pitch at home plate, as described herein with reference to FIG. 1B. A pitch that crosses home plate near the center of the strike zone can have a value for the final location component that is higher than a pitch that crosses home plate near an edge or corner of the strike zone. Similarly, the final location component of a pitch can increase as a pitch gets farther from the strike zone. In such embodiments, the coefficient Cloc can be a negative number so that an increase in the final location component results in a decrease in the trajectory metric.

The speed adjustment parameter, Sadj, can be in the form of the equation:

$$Sadj=(S-Th)$$

where S is the measured or determined speed of the pitch and Th is a speed threshold adjustment. Accordingly, a pitch with a speed that is greater than the speed threshold adjustment results in a positive speed adjustment parameter and a pitch with a speed less than the speed threshold adjustment results in a negative speed adjustment parameter.

The pitch quality rating, PQ, can be in the form of the equation:

$$PQ=Ct*T+Cs*Sadj+Cscale$$

where Ct is a scaling factor for the trajectory metric, Cs is a scaling factor for the speed adjustment parameter, and Cscale is a rating offset. The values of Ct, Cs, and Cscale can be configured to achieve a desired or targeted scale (e.g., −10 to 10, 0 to 10, 0 to 100, etc.). The relative values of Ct and Cs can be configured to relatively weight the contributions of the trajectory metric and the speed adjustment parameter. The coefficient Cs can be positive such that a positive speed adjustment parameter increases the pitch quality rating (e.g., a pitch with a speed greater than the speed threshold adjustment increases the pitch quality rating).

In a particular example, where the final scale of the pitch quality rating is configured so that a majority of pitches from major league pitchers have a value between 0 and 10, the coefficient Ct can be between 1 and 1.5, the coefficient Cs can be between 0.08 and 0.12, and the coefficient Cscale can be between 0.4 and 0.8. The speed threshold adjustment can be between 65 and 85, between 50 and 100, between 70 and 80, or between 60 and 90 where the speed of the pitch is measured in miles per hour. The trajectory metric can be configured so that a majority of pitches by a major league pitcher results in a trajectory metric between −10 and 10.

In some embodiments, it is desirable to select parameters which are independent from one another to increase or maximize the amount of information about the pitch while utilizing a relative small number of parameters for simplicity of the model. In some embodiments, dependent variables can be used. In such cases, mathematical and statistical methods can be applied which account for the interdependency of the parameters. One such method is principal components analysis which can be used to take multiple dependent parameters and generate an orthogonal set of variables. This can allow for a reduction in dimensionality (e.g., reducing the number of parameters) without losing a significant amount of information as the variables can be ordered according to the amount of information they carry. Accordingly, both velocity and total break could be used in a pitch rating model even if the two parameters are not independent from one another.

The pitch rating can have a customized scale to enable ready understanding of the rating. For example, the scale can be configured such that the majority of pitches have a pitch rating between 0 and 10, with 10 being a pitch of extremely high quality (e.g., higher than an average pitch by a statistically significant margin). Another scale can be configured to have a value that is typically between 60 and 100. This scale may also be advantageous because it is similar to a metric for speed (e.g., miles per hour). Another scale may have typical values that range from 0 to 1, where the number reflects a probability that a hitter will hit the pitch. Hence, a pitch with a rating of 0 would be impossible (or nearly impossible) to hit. This scale may be advantageous as it is similar to other scales in baseball such as batting average. Other scales can be used and need not always start and/or end at 0. Scales can range from −10 to 10, −1 to 1, or −5 to 20, for example. In some embodiments, there is no upper or lower bound to the pitch rating. The pitch rating can have any value ranging from negative infinity to positive infinity, where the pitch rating is determined by the relevant coefficients of a trajectory metric and/or a speed adjustment parameter along with measured or determined pitch parameters. The pitch rating can be scaled, however, so that most pitches receive a value within a preferred, desirable, or targeted range. For example, the pitch model can be configured to assign most pitches thrown by starting pitchers in Major League Baseball to have a value between 0 and 10 (or any other scale), but yet not be constrained within those values. This can allow for pitches that are above (or below) average to have an appropriate pitch rating reflecting how far away from average the pitch is (e.g., a pitch of 11 would stand out against most pitches receiving a score between 5 and 8). The pitch rating can have an ascending (e.g., better pitches receive a higher score) or descending scale (e.g., better pitches receive a lower score).

In some embodiments, the pitch rating can be combined with another metric to provide a combined metric, such as an adjusted metric which accounts for pitch quality. For example, the pitch rating can be configured to act as a scaling factor or addition to the speed metric, and may be referred to as a quality-adjusted speed or speed-adjusted quality score, so that a high quality curveball would have a combined metric (e.g., quality-adjusted speed) similar to a high-quality fastball.

The pitch rating can be configured to be statistically correlated with subjective ratings of pitches provided by pitching experts or other relevant judges of pitch quality. For example, where the pitch rating module determines the pitch rating to be 75 (e.g, on a scale where the majority of pitches receive a pitch rating between 0 and 100), it can mean that if a representative number of experts were asked to assess the quality of that same pitch using the same scale (e.g., constrain the experts to rate pitches between 0 and 100), the average of their responses would be about 75. In this way, the pitch rating module 225 can be configured to automatically generate a pitch rating value tuned to approximate a quality assessment by an expert. Accordingly, the pitch rating value can be indicative of a quality of a pitch. An example method for tailoring the pitch rating determination using subjective opinions of experts is presented in the draft paper included in Appendix, which is incorporated herein by reference so as to form part of this specification.

This can be useful, for example, where a team derives a custom or tailored pitch model according to the systems and methods described herein, where the pitch model is tailored to statistically correlate with assessments of pitches from a number of their own experts. This can then represent a proprietary pitch model which reflects a collective knowledge or input from experts in a controlled environment. This knowledge, incorporated into the pitch model, can then be used by disparate scouts or other personnel in various locations and at various levels to assess the skills of a variety of pitchers. In this way, the team can benefit from the collective knowledge and skill of a group of experts without sending these experts to physically scout pitchers. This can save time and effort, making the scouting process more uniform and less subjective.

In some embodiments, the pitch rating can be configured to be statistically correlated with batter performance for the pitch. The pitch rating thus reflects how hard it is to hit. The pitch rating can be tailored based on historical data from actual gameplay or in practice or other organized scenarios. In such cases, the pitch rating can be tuned to batter success rather than or in addition to expert judgment. In some implementations, the pitch rating model trained on expert judgment data can be refined by looking at batter successes. In this way, the rating quality can reflect both expert opinion and actual in-game results.

The system 100 includes the optional display 110 configured to display information relevant to the pitching rating. For example, the display 110 can be configured to show the path of the pitch, the values or visual indications of the values of the parameters used in the calculation, pitch speed, and/or the pitch rating. In some embodiments, the display 110 includes a user interface 112 which allows a user to select and/or tune the pitch rating model from one or more models. The user interface 112 can be configured to allow a user to tune or modify one or more coefficients in the pitch rating model, to choose which parameters are used to calculate the pitch rating, and/or to choose the scale factor of the pitch rating. The user interface 112 can include a touchscreen interface, a keyboard, buttons, pads, or the like for receiving user input.

Figure 3:
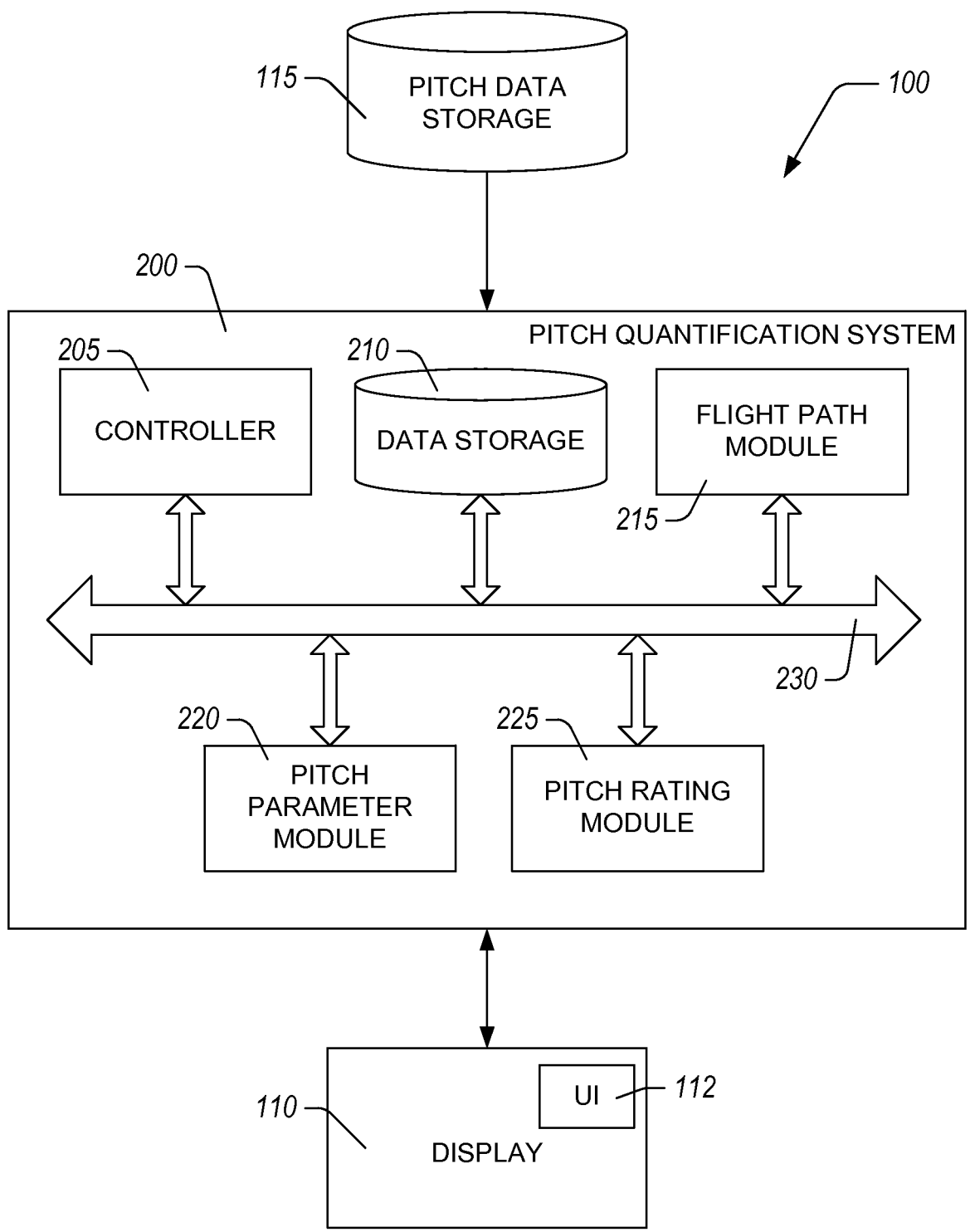
FIG. 3 illustrates a block diagram of an example system for assigning pitch ratings to stored pitch data for a large number of pitches.

FIG. 3 illustrates a block diagram of the example system 100 configured to assign pitch ratings to stored or archived pitch data for a relatively large number of pitches. The system 100 is similar to the system 100 described with reference to FIG. 2 except that the pitch data (e.g., the position of the ball as a function of time or at a plurality of points in time for a pitch) is provided by pitch data storage 115. Pitch data storage 115 can include archived or stored information about prior pitches. In this way, the system 100 can receive the archived pitch data and generate a pitch rating for each pitch with stored data. For example, the system 100 can be configured to determine a pitch rating for at least 100 pitches in less than 1 second. The number of pitches in the pitch data storage 115 can be greater than 100 pitches, greater than 1000 pitches, greater than 10,000 pitches, or greater than 100,000 pitches. The system 100 can be configured to determine a pitch rating for each pitch in pitch data storage 115 wherein the entire process takes less than 1 minute, less than 30 seconds, less than 10 seconds, or less than 1 second. This can allow rapid testing of the effects of different pitch rating models to improve or optimize the model.

Example Pitch Rating Devices

Figure 4A:
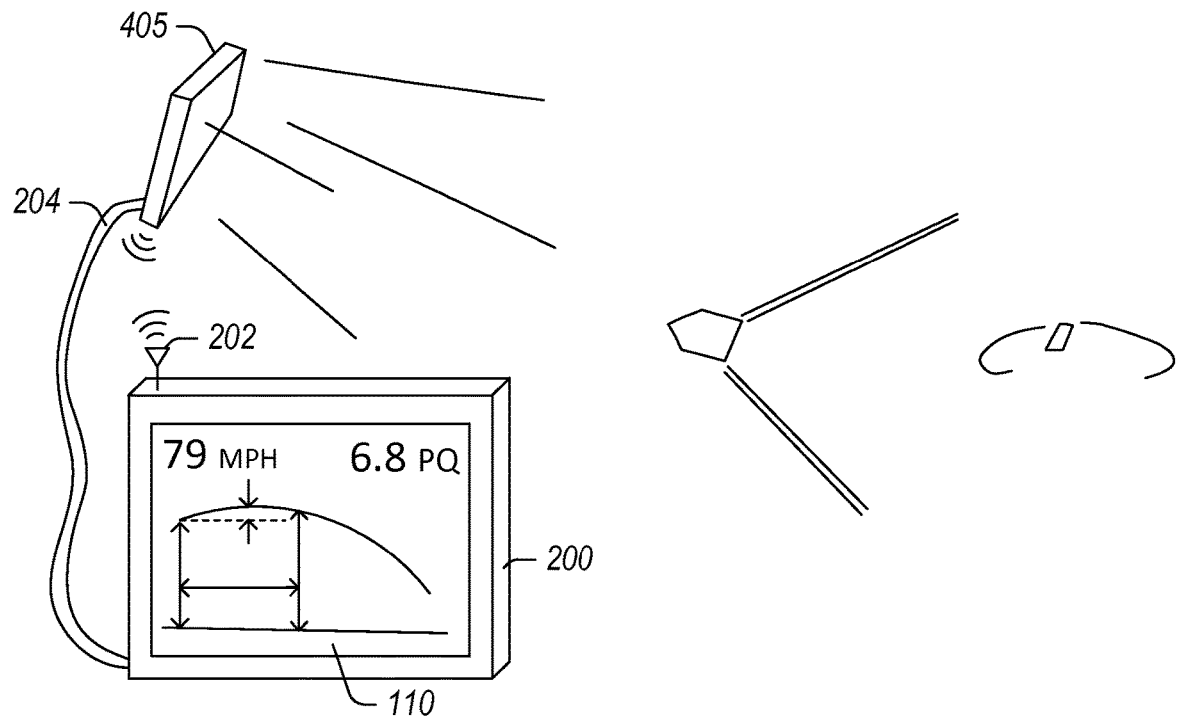
FIG. 4A illustrates an example pitch rating system configured to detect a pitched ball and automatically calculate a pitch rating.

FIG. 4A illustrates an example pitch rating device 400 configured to detect a pitched ball and automatically calculate a pitch rating. The pitch rating device 400 comprises a Doppler radar detector 405 configured to detect a baseball within a stadium during a baseball game. The Doppler radar detector 405 can be configured to identify the ball among the various objects and people on the field, track the ball, and provide the tracking information to a pitch quantification system 200 through wireless communication (e.g., through antenna 202), wired connections (e.g., through cable 204), or a combination of both of these. The pitch quantification system 200 can include a display 110 which shows details about the pitch (e.g., speed, trajectory, flight path parameters, etc.) and the automatically calculated pitch rating (e.g., pitch quality or "PQ"). In some embodiments, the pitch rating device 400 calculates the pitch rating in real time or near real time.

Figure 4B:
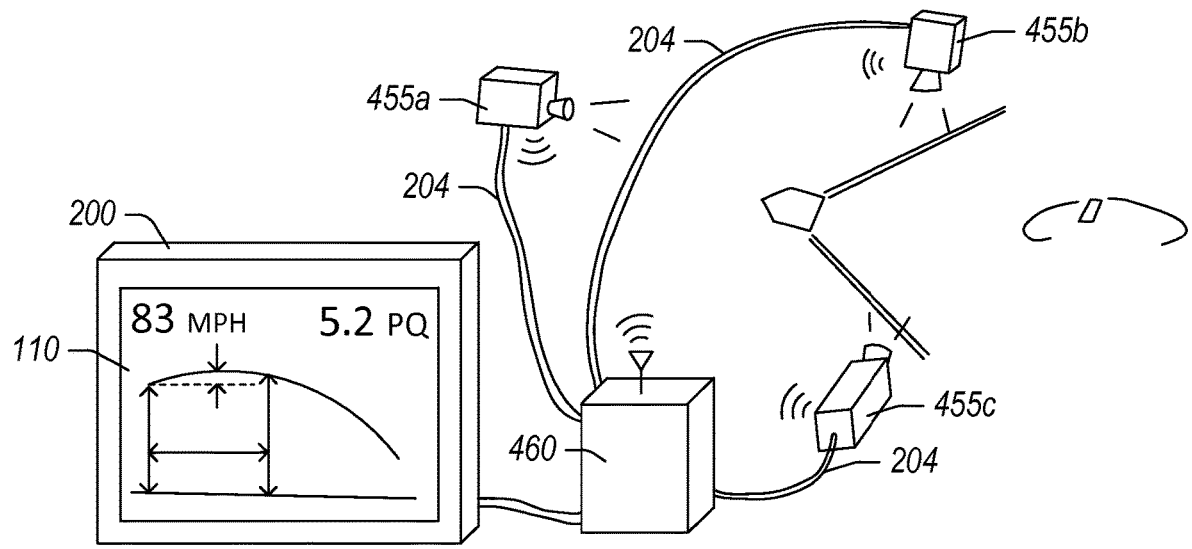
FIG. 4B illustrates an example pitch rating system configured to track a pitched ball and automatically calculate a pitch rating.

FIG. 4B illustrates another example pitch rating device 450 configured to detect a pitched ball and automatically calculate a pitch rating. The pitch rating device 450 includes a plurality of cameras 455a, 455b, 455c acquiring video data of the baseball field. The plurality of cameras 455a, 455b, 455c can send the video data to an object detection system 460 configured to extract the position, velocity, and/or acceleration of the ball from the video data. The object detection system 460 can send the position, velocity, and/or acceleration information to the pitch quantification system 200 which can display information representative of a flight path of the pitch along with one or more parameters generated by the pitch quantification system 200 or provided by the object detection system 460 (e.g., speed, trajectory, flight path parameters, etc.) and the pitch rating or PQ. In some embodiments, the pitch rating device 450 calculates the pitch rating in real time or near real time.

Figure 5:
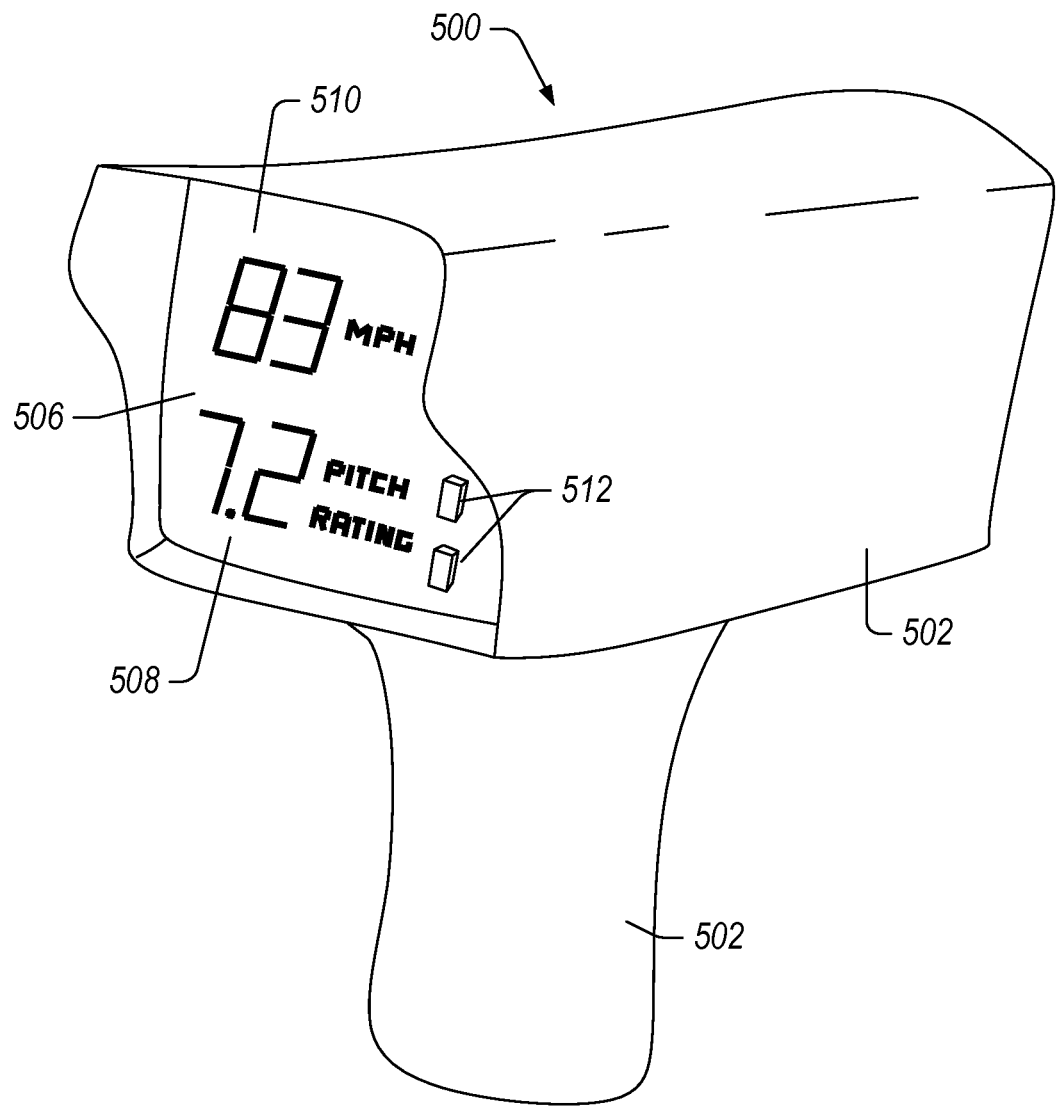
FIG. 5 illustrates an example radar gun configured to determine a speed and a pitch rating for a pitch.

FIG. 5 illustrates an example radar gun 500 configured to determine a speed and a pitch rating for a pitch. The radar gun 500 can include a housing 502 which contains an object-detection and tracking system (e.g., a radar system, sensor tracking system, etc.) configured to detect and track a baseball. A user can hold the radar gun 500 by the handle 504, point it at a pitch and trigger the radar gun 500 to detect and determine a speed and pitch rating. The radar gun 500 includes display 506 configured to display the results of the calculations. The speed can be displayed in a first area 510 and the pitch rating can be displayed in a second area 508. In this way, the radar gun 500 can provide the two metrics for quick assessment of the quality of the pitch. The radar gun 500 can also include user interface elements 512 to enable various functions of the radar gun 500, such as switching between pitch rating models, units, etc. The radar gun can include electronics within the housing 502 wherein the electronics are configured to determine the pitch rating based on the data provided by the object-detection and tracking system within the radar gun housing 502. The radar gun 500 can determine the pitch rating according to the methods described elsewhere herein.

In some embodiments, the radar gun 500 can be calibrated based on markers within the field of view of the radar gun (e.g., a marker for home plate, the pitcher's mound, a strike zone, a release point of the pitcher, etc.). The markers can be configured to provide distance and/or position information to the radar gun so that the flight path of the ball can be determined. In this way, the radar gun 500 can determine a flight path of the pitch, extract trajectory components from the determined flight path, and calculate a pitch rating based on the extracted trajectory components and/or speed of the pitch.

Example Pitch Rating Method

Figure 6:
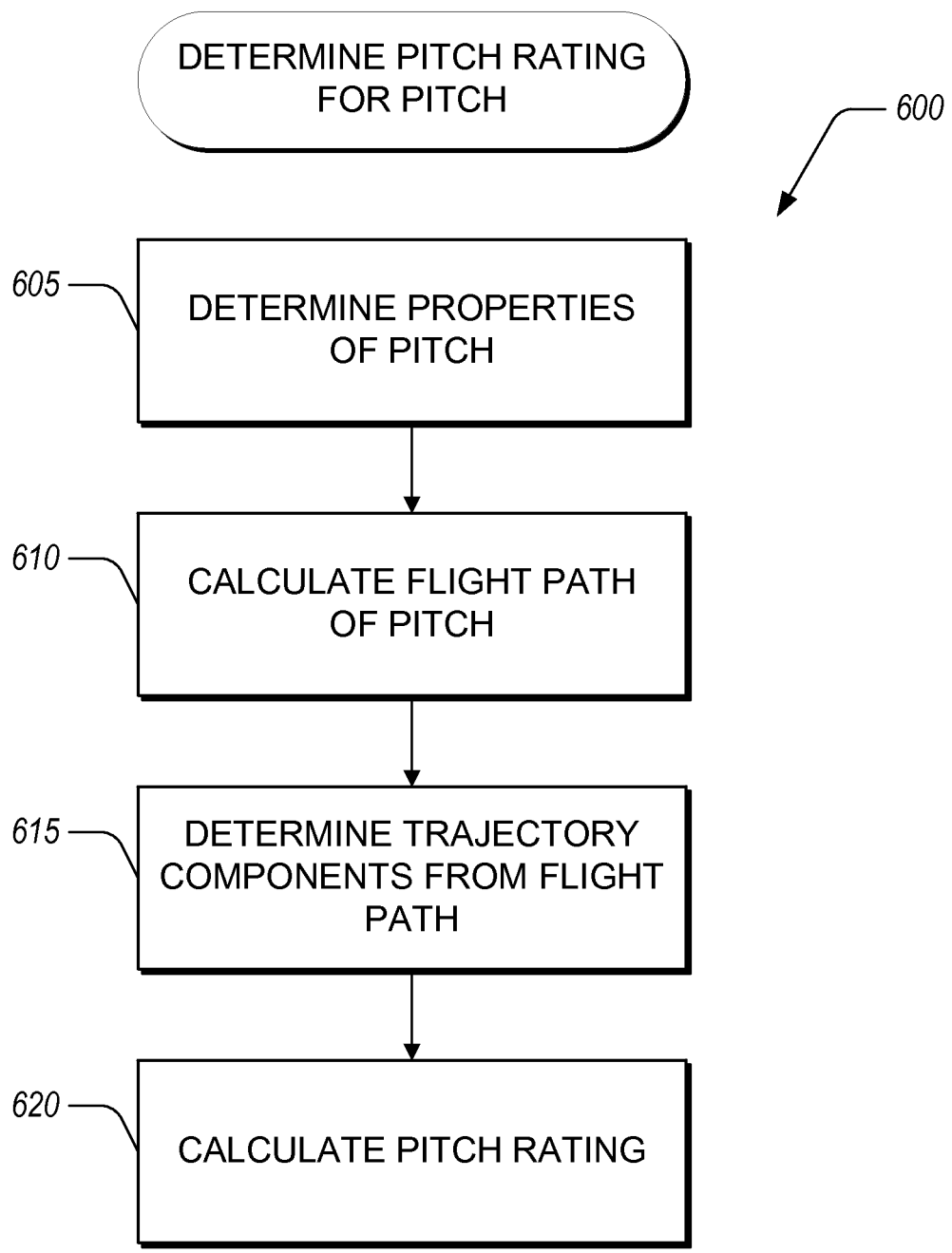
FIG. 6 illustrates a flow chart of an example method of assigning a pitch rating to a pitch.

FIG. 6 illustrates a flow chart of an example method 600 of assigning a pitch rating to a pitch. The method 600 can be performed by the system 100 described herein with reference to FIGS. 2 and 3, the pitch rating device 400 described herein with reference to FIG. 4A, the pitch rating device 450 described herein with reference to FIG. 4B, or the radar gun 500 described herein with reference to FIG. 5. One or more of the steps can be performed by a single module or multiple modules or systems can be used to perform a single step or combination of steps.

In step 605, properties of the pitched ball are determined where the properties include a position, velocity, and/or acceleration of the ball. The properties may also include a sequence of position vectors can be determined and/or stored, where the position vectors include coordinates of the ball (e.g., $x_j$, $y_j$, $z_j$) for a plurality of times, $t_j$. The position vectors can be provided over regular intervals, such as every 0.1 s, 0.05 s, 0.01 s, or 0.001 s, or at irregular time intervals. The typical duration of a major league pitch, or the amount of time between when the pitcher releases the ball and when the ball arrives and home plate, is between about 0.35 s and about 0.45 s. Therefore, the determined properties of the pitched ball can include dozens or hundreds of vectors or data points (e.g., position, velocity, and/or acceleration) at different points in time during the flight of the ball. As described herein, a detector system can provide this information by detecting and tracking the baseball. Examples of such detectors include Doppler radars, video cameras, sensor tracking devices, etc. In some embodiments, the detector system provides information as a function of time or at a plurality of points in time. In some embodiments, the detector system provides position, velocity, and acceleration of the ball at one or more points in time. In some embodiments, the properties of the pitched ball includes revolutions per minute or spin rate of the ball.

In step 610, the flight path of the ball is determined. This can include plotting the path of the ball in 2 or 3 dimensions as a function of time or at a plurality of points in time. The flight path can be mathematically transformed or constrained to lie within a single plane, as described herein. The flight path of the ball can be determined using physics models to transform the information determined in step 605 to a flight path of the ball. For example, where values are given for position, velocity, and acceleration of the ball at a point in time, equations can be used to determine a likely flight path of the ball. The equations can incorporate effects on the ball such as drag forces and/or Magnus effects.

In step 615, pitch parameters are extracted from the flight path. In this step, locations of interest are identified in the flight path, such as the point of release, the maximum height, the final location, and the like. In this step, derived parameters are also extracted such as the rise, knee distance, breaking point distance, vertical break, horizontal break, and the like. In some embodiments, multiple variables can be combined in a principal components analysis to generate independent parameters for use in determining a pitch rating. In some embodiments, position, velocity, acceleration, rate of spin, or the like can be extracted.

In step 620, the pitch rating is calculated by inputting the extracted parameters into a pitch rating model. The pitch rating model includes coefficients for parameters, interaction terms, quadratic terms, etc. which combine and scale the relevant parameters so that the pitch rating is indicative of a quality of the pitch. The pitch rating model can be trained to be statistically correlated to subject expert opinion, to batter success or failure, or a combination of these. The pitch rating model can combine trajectory-based metrics with speed to account for the quality of breaking and non-breaking pitches.

Example Analytical Results

To illustrate the pitch rating, an analysis has been performed of two pitchers in two different games. Pitcher 1 pitched a complete game no hitter and Pitcher 2 pitched an average game and was pulled in the middle of the game. TABLE 1 includes results of applying a pitch rating model to the pitch data for each pitch thrown, for the first 20 pitches for Pitchers 1 and 2. Column 1 includes the pitch number, column 2 includes the inning for Pitcher 1, column 3 includes the trajectory metric (T) described herein for Pitcher 1, column 4 includes the speed of the pitch for Pitcher 1, column 5 includes the pitch quality rating (PQ) that adjusts the trajectory metric based on a speed adjustment parameter for Pitcher 1, column 6 includes the inning for Pitcher 2, column 7 includes the trajectory metric (T) for Pitcher 2, column 8 includes the speed of the pitch for Pitcher 2, and column 9 includes the pitch quality rating (PQ) for Pitcher 2. The results for the entire game of Pitcher 1 is shown as a graph 700a in FIG. 7A, where each data point on the graph 700a represents the average of 7 pitches. The first point corresponds to the average of the first seven pitches, the second point corresponds to the average of the next seven pitches (i.e., pitches 8-14), and so on. The results for the entire game of Pitcher 2 is shown as two graphs, one graph 700b for off-speed pitches and one graph 700c for fastballs, in FIGS. 7B and 7C. In each graph 700a-c illustrated in FIGS. 7A-7C, the dashed line 705a-c represents the trajectory metric, the solid line 710a-c represents the pitch quality rating, and the dotted line 715a-c represents a linear trend line fit to the pitch quality rating.

TABLE 1

| | Pitcher 1 | | | | Pitcher 2 | | | |
| --- | --- | --- | --- | --- | --- | --- | --- | --- |
| Pitch | Inning | T | Speed | PQ | Inning | T | Speed | PQ |
| 1 | 1 | 4.39 | 93.3 | 7.55 | 1 | 1.71 | 90.6 | 4.25 |
| 2 | 1 | 1.76 | 93.3 | 4.56 | 1 | 4.93 | 71.7 | 6.2 |
| 3 | 1 | −0.1 | 94.6 | 2.56 | 1 | −1 | 92.1 | 1.3 |
| 4 | 1 | −2.52 | 90.5 | −0.58 | 1 | 3.75 | 92 | 6.71 |
| 5 | 1 | 2.63 | 93.8 | 5.59 | 1 | 2.86 | 85.2 | 5.07 |
| 6 | 1 | 3.39 | 85 | 5.66 | 1 | 3.46 | 85 | 5.73 |
| 7 | 1 | −0.14 | 93.4 | 2.4 | 1 | 2.62 | 92.7 | 5.49 |
| 8 | 1 | 3.03 | 94.4 | 6.11 | 1 | 2 | 75.9 | 3.23 |
| 9 | 1 | −1.04 | 88 | 0.88 | 1 | 4.84 | 74.5 | 6.34 |
| 10 | 1 | 1.93 | 72.4 | 2.83 | 1 | 2.23 | 93 | 5.07 |
| 11 | 1 | 4.53 | 87.2 | 7.15 | 1 | 0.45 | 92.6 | 3 |
| 12 | 1 | 2.29 | 93.8 | 5.21 | 1 | 0.84 | 82.8 | 2.55 |
| 13 | 2 | −0.13 | 92 | 2.29 | 2 | 3.05 | 83.6 | 5.15 |
| 14 | 2 | 2.89 | 92.1 | 5.74 | 2 | 1.15 | 92.2 | 3.76 |
| 15 | 2 | 2.57 | 92.2 | 5.39 | 2 | 6.44 | 73.6 | 8.09 |
| 16 | 2 | 5.56 | 72.6 | 6.99 | 2 | 3.52 | 92.2 | 6.46 |
| 17 | 2 | 1.39 | 92.5 | 4.06 | 2 | 4.83 | 73.2 | 6.22 |
| 18 | 2 | 4.2 | 84.6 | 6.55 | 2 | 4.12 | 82.3 | 6.24 |
| 19 | 2 | 3.72 | 93.1 | 6.77 | 2 | 3.48 | 83.3 | 5.6 |
| 20 | 2 | 0.19 | 74.5 | 1.05 | 2 | 3.25 | 92 | 6.14 |

Figure 7A:
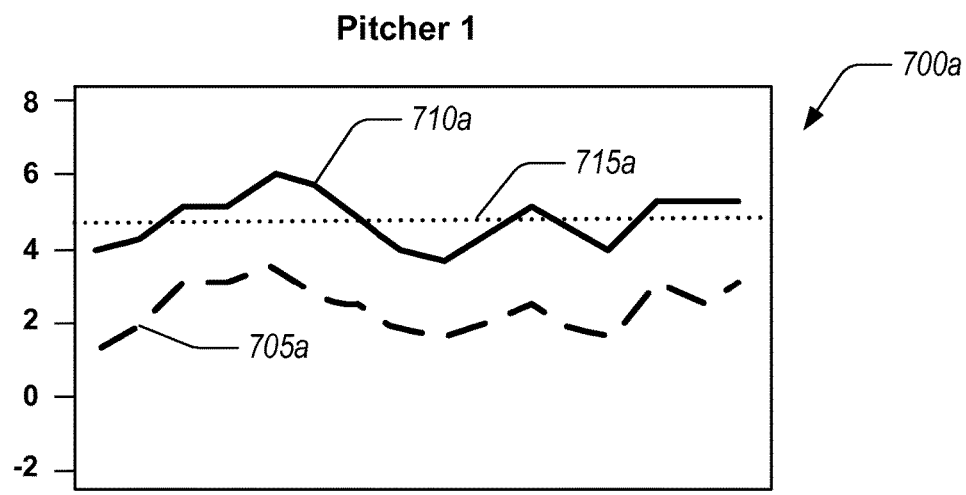
FIGS. 7A-7C illustrate graphs of pitch ratings for two different pitchers in two different games.
Figures 7B, 7C:
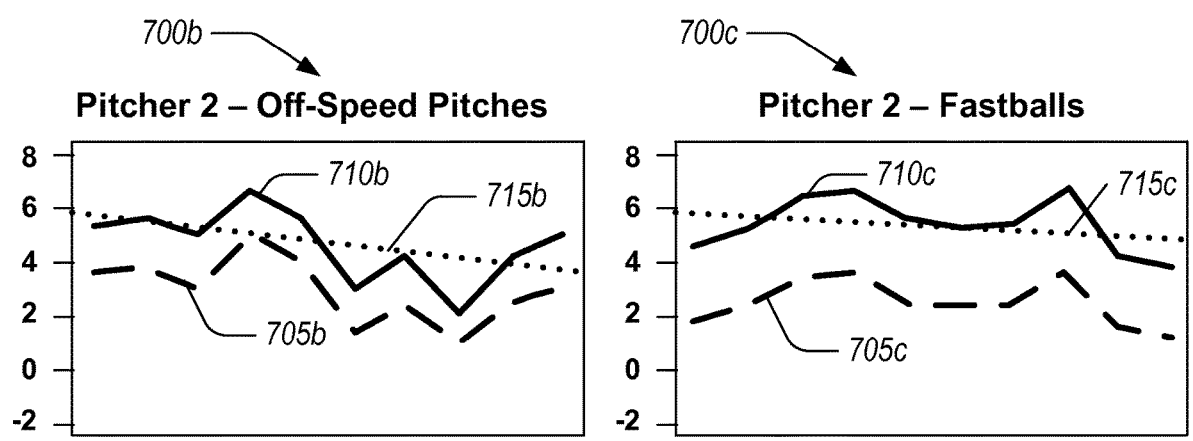

As can be seen in TABLE 1 and FIGS. 7A-7C, the pitch quality rating provides a good indicator of pitch quality. Furthermore, when comparing the fastball pitches to the off-speed pitches of Pitcher 2 in the graphs 700b, 700c shown in FIGS. 7B and 7C, respectively, it is evident that the quality of the off-speed pitches was declining over the course of the game, leading to Pitcher 2 being pulled from the game. No such decline in performance is seen in the graph 700a shown in FIG. 7A, demonstrating that Pitcher 1 was able to deliver relatively high quality pitches throughout the game, contributing to the fact that Pitcher 1 threw a no-hitter.

Conclusion

As would be apparent based on the foregoing disclosure, the pitch rating systems and methods described herein can be configured to provide a pitch rating applicable to breaking and non-breaking pitches, which includes pitches that some may consider to be neither breaking or non-breaking pitches (e.g., knuckle balls). A pitch model can be constructed that incorporates a variety of parameters so that pitches of different types can receive a relevant, valuable, and useful pitch rating indicative of a quality of the pitch.

By incorporating the position, speed, and acceleration as a function of time, a pitch model can be configured to determine a pitch rating that accounts for movement of a pitch over large and/or small scales so that it provides a relevant quality metric for breaking and non-breaking pitches. To illustrate this advantageous aspect of the pitch rating, examples of different pitches are discussed. Curveballs can have a relatively large total break, a relatively slow speed, and follow a relatively smooth flight path. Fastballs can have a relatively small break, a relatively high speed, and follow a relatively smooth flight path. Knuckle balls can have a relatively small break, a relatively slow speed, and follow a flight path that has unpredictable deviations from a smooth flight path. A single pitch model can be constructed which considers each of these relevant factors in assigning a pitch rating. For example, the pitch model can combine the total break, the speed, and deviation from a predicted or smooth flight path (e.g., by assessing instantaneous velocity and/or acceleration as a function of time), among other parameters, to determine the pitch rating. By weighting and combining the relevant parameters, the pitch model can assign a pitch rating which provides a useful comparison of pitches of all different types.

The pitch rating can be useful in assigning a uniform and objective metric to pitches of any type, reducing or eliminating the subjective nature of assessing the skill and quality of pitchers. This can be useful for teams employing baseball scouts who travel to disparate locations and scout players playing in leagues where the average skill level may differ significantly. The pitch rating can be used to make scouting assessments more uniform and less subject to subjective assessments from individual scouts. This can be useful for comparing assessments of pitchers provided by different scouts, as the pitch rating can normalize and make uniform pitch quality assessment.

The pitch rating can facilitate communication about the quality of pitches between people and organizations. Providing a universal pitch rating system, or an agreed-upon pitch rating system, can provide different people and organizations a way to easily communicate with one another about the quality of a pitch and pitchers. Thus, negotiations about pitchers between American and Japanese baseball teams can utilize the pitch rating to facilitate communication regarding the skill of the pitcher, reducing or removing the subjective nature of scouting reports and/or reducing or removing dependence on metrics which are related to the skill of the players in the league (e.g., opposing players' batting average, ERA, etc.).

The pitch rating can provide information about pitching performance throughout the course of a game. Whereas the speed of a pitcher's pitches may remain fairly consistent throughout the course of a game, the pitch rating may show that the quality of the pitches is diminishing over time. This can be useful for coaches to aid in the decision to replace a pitcher during a game. This can be useful for spectators to understand the progression of the pitcher's performance over the course of a game. This can also be used to assess a pitcher's health where tracking the pitch rating over time and over a number of games can be used to identify when a pitcher is in danger of injury, the effects of pitch count on a pitcher's health, and the like. Accordingly, sports medicine can benefit from the pitch rating metric for assessing long term effects of pitching on health.

Although certain preferred embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described herein. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Each of the processes, methods, and algorithms described herein and/or depicted in the attached figures (including figures in the appendices) may be embodied in, and fully or partially automated by, code modules executed by one or more physical computing systems, computer processors, application-specific circuitry, and/or electronic hardware configured to execute computer instructions. For example, computing systems can include special-purpose computers, servers, desktop computers, laptop or notebook computers or tablets, personal mobile computing devices, mobile telephones, and so forth. A code module may be compiled and linked into an executable program, installed in a dynamic link library, or may be written in an interpreted programming language.

Various embodiments have been described in terms of the functionality of such embodiments in view of the general interchangeability of hardware and software. Whether such functionality is implemented in application-specific hardware or circuitry or in software executing on one or more physical computing devices depends upon the particular application and design constraints imposed on the overall system. Further, certain implementations of the functionality of the present disclosure are sufficiently mathematically, computationally, or technically complex that application-specific hardware or one or more physical computing devices (utilizing appropriate executable instructions) may be necessary to perform the functionality, for example, due to the volume or complexity of the calculations involved or to provide results substantially in real-time.

Code modules may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames) The results of the disclosed processes and process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer or software product or packaged into multiple computer or software products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network (e.g., a terrestrial and/or satellite network) or any other type of communication network.

The various elements, features and processes described herein may be used independently of one another, or may be combined in various ways. All possible combinations and sub-combinations are intended to fall within the scope of this disclosure. Further, nothing in the foregoing description is intended to imply that any particular feature, element, component, characteristic, step, module, method, process, task, or block is necessary or indispensable. The example systems and components described herein may be configured differently than described. For example, elements or components may be added to, removed from, or rearranged compared to the disclosed examples.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" or "an" as used in this application and the appended claims are to be construed to mean "one or more" or "at least one" unless specified otherwise. As used herein, the words "about" or "approximately" mean that the corresponding value is within 10% of the stated value, within 5% of the stated value, or within 1% of the stated value, unless otherwise indicated. As used herein, the word "substantially" means that the corresponding value at least 90% of the stated value, at least 95% of the stated value, or at least 99% of the stated value, unless otherwise indicated.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The foregoing disclosure, for purpose of explanation, has been described with reference to specific embodiments, applications, and use cases. However, the illustrative discussions herein are not intended to be exhaustive or to limit the inventions to the precise forms disclosed. Many modifications and variations are possible in view of the above teachings. The embodiments were chosen and described in order to explain the principles of the inventions and their practical applications, to thereby enable others skilled in the art to utilize the inventions and various embodiments with various modifications as are suited to the particular use contemplated.

What is claimed is:

1. A system for automatically determining a pitch rating for a pitch in baseball, the pitch rating indicative of a quality of the pitch, the system comprising:
   one or more hardware processors;
   a detection system configured to, in use, be executed by the one or more hardware processors to detect a ball in flight and to determine a position and a speed of the ball, wherein the detection system comprises at least one of: (a) a Doppler radar system that includes one or more antennas, (b) an imaging system that captures video, or (c) a sensor tracking system, from which at least the position of the ball is determined using the one or more of (a), (b), or (c) by the detection system;

a pitch quantification system that is in communication with the detection system and that comprises:
- a flight path module configured to, in use, be executed by the one or more hardware processors to receive from the detection system detection data including the position and speed of the ball, and to determine an initial position coordinate point representative of an initial position of the ball and a plurality of additional coordinate points representative of a flight path of the ball, the plurality of additional coordinate points including a maximum height coordinate point, each of the initial position coordinate point and the plurality of additional coordinate points comprising:
  - an x-coordinate describing a distance along an x-axis parallel to the ground;
  - a y-coordinate describing a distance along a y-axis parallel to the ground and perpendicular to the x-axis; and
  - a z-coordinate describing a distance along a z-axis perpendicular to both the x-axis and y-axis;
  wherein the maximum height coordinate point comprises a z-coordinate equal to the largest z-coordinate of any of the initial position coordinate point or the plurality of additional coordinate points;
- a pitch parameter module configured to, in use, be executed by the one or more hardware processors to receive the initial position coordinate point and the plurality of additional coordinate points from the flight path module and to generate pitch parameters corresponding to properties of the path of the ball, the generated pitch parameters including:
  - a rise component determined based at least in part on a difference between the z-coordinate of the maximum height coordinate point and the z-coordinate of the initial position coordinate point,
  - a breakpoint component determined based at least in part on a difference between the y-coordinate of the maximum height coordinate point and the y-coordinate of the initial position coordinate point,
  - a vertical break component,
  - a horizontal break component, and
  - a final location component determined based at least in part on the x-coordinate and the z-coordinate of a final position coordinate point, wherein the final position coordinate point is selected from the plurality of additional coordinate points to have a y-coordinate matching a predetermined location on the y-axis; and
- a pitch rating module configured to, in use, be executed by the one or more hardware processors to:
  - determine a trajectory metric as a linear combination of the generated pitch parameters;
  - determine a speed adjustment parameter by taking a difference between the speed of the ball and a speed threshold; and
  - generate the pitch rating indicative of the quality of the pitch, the pitch rating equal to a mathematical combination of the trajectory metric and the speed adjustment parameter,
  wherein use of the pitch quantification system to generate the pitch rating for the pitch and pitch ratings for additional pitches provides an improved metric for standardized comparison of pitch quality across pitches of a plurality of different pitch types relative to pitch scoring systems that do not account for each of rise, breakpoint, vertical break, horizontal break and final location; and
- a display system that is in communication with the pitch quantification system and is configured to receive and display the pitch rating in real time.

2. The system of claim 1, wherein the detection system comprises a Doppler radar system.

3. The system of claim 1, wherein the detection system comprises a plurality of video cameras (as the imaging system) and a position extraction module configured to analyze the images from the plurality of video cameras to extract the position of the ball, a velocity vector of the ball, and an acceleration vector of the ball at a point in time after the pitch has been released, in which the detection data further comprises the velocity vector of the ball and the acceleration vector of the ball.

4. The system of claim 1, wherein the pitch rating module includes coefficients associated with each of the generated pitch parameters.

5. The system of claim 1, wherein the pitch rating is equal to a linear combination of the trajectory metric and the speed adjustment parameter.

6. The system of claim 1, wherein the detection system is configured to determine the position and the speed of the ball for a distance of at least 10 meters along the y-axis.

7. The system of claim 1, wherein the plurality of different pitch types comprises a curveball, a slider, a fastball, and a change-up.

8. The system of claim 1 further comprising a non-transitory computer readable medium that is in communication with the pitch quantification system to receive and store the pitch rating.

9. The system of claim 4, wherein the coefficients are configured so that variations in the final location component affect the calculated pitch rating more than variations in the rise component.

10. The system of claim 4, wherein the pitch rating module is configured to determine the trajectory metric equal to a sum of the respective products of:
- the rise component and a rise coefficient;
- the breakpoint component and a breaking point coefficient;
- the vertical break component and a vertical break coefficient;
- the horizontal break component and a horizontal break coefficient; and
- the final location component and a final location component coefficient.

11. The system of claim 9, wherein the coefficients are configured so that variations in the final location component affect the calculated pitch rating more than variations in the other components.

12. The system of claim 10, wherein the pitch rating module is further configured to determine the speed adjustment parameter is equal to a speed of the pitch minus a speed threshold value so that speeds above the threshold value increase the value of the pitch rating and speeds below decrease the value of the pitch rating.

13. The system of claim 12, wherein the pitch rating module is configured to calculate the pitch rating as a sum of a scaled trajectory metric, a scaled speed adjustment parameter, and a rating offset, the scaled trajectory metric equal to the trajectory metric multiplied by a trajectory scaling factor and the scaled speed adjustment parameter equal to the speed adjustment parameter multiplied by a speed adjustment scaling factor.

14. The system of claim 13, wherein the pitch rating is configured to have a value such that a majority of pitches have a value between −10 and 10.

\* \* \* \* \*